US008245367B2

(12) United States Patent
Kato et al.

(10) Patent No.: US 8,245,367 B2
(45) Date of Patent: Aug. 21, 2012

(54) FASTENER

(75) Inventors: Kouichi Kato, Kanagawa (JP); Shigeo Okada, Kanagawa (JP); Takeshi Nakajima, Kanagawa (JP)

(73) Assignee: Piolax Inc., Yokohama-Shi, Kanagawa (JP)

( * ) Notice: Subject to any disclaimer, the term of this patent is extended or adjusted under 35 U.S.C. 154(b) by 398 days.

(21) Appl. No.: 12/452,590

(22) PCT Filed: Feb. 5, 2008

(86) PCT No.: PCT/JP2008/051801
§ 371 (c)(1),
(2), (4) Date: Jan. 11, 2010

(87) PCT Pub. No.: WO2009/008185
PCT Pub. Date: Jan. 15, 2009

(65) Prior Publication Data
US 2010/0162534 A1      Jul. 1, 2010

(30) Foreign Application Priority Data

Jul. 12, 2007 (JP) ................................ 2007-183586

(51) Int. Cl.
*A44B 17/00* (2006.01)

(52) U.S. Cl. ................ 24/458; 24/292; 24/297; 24/456; 248/304; 411/913

(58) Field of Classification Search .................... 24/289, 24/292, 297, 453, 456–460; 248/304; 296/1.02, 296/214; 411/508, 913
See application file for complete search history.

(56) References Cited

U.S. PATENT DOCUMENTS

| 3,479,075 A | * | 11/1969 | Swanno | 292/19 |
| 4,527,821 A | * | 7/1985 | Tanaka | 292/19 |
| 5,044,921 A | * | 9/1991 | Micelli et al. | 425/451.9 |

(Continued)

FOREIGN PATENT DOCUMENTS

JP          59-34105          3/1984

(Continued)

*Primary Examiner* — Robert J Sandy
*Assistant Examiner* — Tyler Johnson
(74) *Attorney, Agent, or Firm* — McGinn IP Law Group, PLLC

(57) ABSTRACT

There is provided a fastener which can be fixed in a mounting hole in an ensured fashion and which can be removed from the mounting hole in an easy and ensured fashion.
This fastener 10 includes a main body 20 which is fixed in a mounting hole and a pin member for releasing the engagement of the main body 20 with the mounting hole. The main body 20 has a base portion 21 and a leg portion 30, a pair of elastic engagement pieces 35, 35 are provided on the leg portion 30, and distal end portions 37 of the elastic engagement pieces 35 are extended towards an insertion opening 23 in the pin member 40. The pin member 40 has a head portion 41 and an insertion portion 43, and a pressing surface 48 is provided on the insertion portion 43 for pressing the distal end portions 37 so as to deflect the pair of elastic engagement pieces 35, 35 inwards to such an extent that the elastic engagement pieces are not brought into engagement with the mounting hole when the pin member 40 is pushed in a predetermined distance. A pin-side engagement portion and a main-body-side engagement portion are provided between the pin member 40 and the base portion 21 of the main body 20 for holding the pin member 40 in a predetermined pushed-in position when the pin member 40 is inserted into the base portion 21.

21 Claims, 15 Drawing Sheets

U.S. PATENT DOCUMENTS

| | | | | |
|---|---|---|---|---|
| 5,988,364 | A * | 11/1999 | Boyce et al. | 198/867.15 |
| 7,226,023 | B2 * | 6/2007 | Banno et al. | 248/71 |
| 8,037,582 | B2 * | 10/2011 | Okada et al. | 24/297 |
| 2006/0032031 | A1 * | 2/2006 | Banno et al. | 24/292 |
| 2007/0099452 | A1 * | 5/2007 | Okada et al. | 439/101 |
| 2007/0289770 | A1 | 12/2007 | Koike | |
| 2009/0000085 | A1 * | 1/2009 | Okada et al. | 24/453 |
| 2011/0115349 | A1 * | 5/2011 | Dernier | 312/223.1 |

FOREIGN PATENT DOCUMENTS

| | | |
|---|---|---|
| JP | 63-68505 | 5/1988 |
| JP | 2-1525 | 1/1990 |
| JP | 2007-312530 | 11/2007 |
| JP | 2007-315517 | 12/2007 |

\* cited by examiner

FASTENER

TECHNICAL FIELD

The present invention relates to a fastener including a main body adapted to be brought into engagement with a mounting hole formed in a mount-base part so as to be fixed therein and a pin member adapted to be inserted into the main body so as to release the engagement of the main body with the mounting hole.

BACKGROUND ART

For example, a hook for suspending a shopping back thereon is mounted on a side wall inside a passenger compartment or a rear face of a front seat. To mount such a part on a body panel, there is used a fastener to be inserted through a mounting hole formed in the body panel to thereby be fixed in place in the mounting hole. Incidentally, sometimes, a part such as a hook needs to be removed from a mounting hole when parts are replaced or a vehicle is serviced for maintenance, and a removable fastener is used for such an application.

As a fastener which enables a part to be fixed in a mounting hole and which can be removed therefrom, Patent Document 1 below discloses a fastener including a main body and an operating member, wherein the main body has a pair of elastic portions which are formed on a circumferential wall thereof so as to be deflected via a slit, locking projections which are provided on outer surfaces of the elastic portions so as to project thereof to thereby be brought into engagement with mounting hole, L-shaped plates which are provided on inner surfaces of the elastic portions so as to project therefrom and abutment projections which are provided so as to project from distal ends of the L-shape plates towards the elastic portions side and wherein the operating member has a head portion, a cylindrical member which is provided so as to project from a rear surface of the head portion to thereby be inserted into the main body, first stepped portions which are provided on an inner wall on a distal end side of the cylindrical member so as to be brought into engagement with the abutment projections when the operating member is pushed shallowly into the main body and second stepped portions which are provided in positions closer to a proximal end side of the inner wall of the cylindrical member than the first stepped portions and which project further inwards than the first stepped portions so as to be brought into engagement with the abutment projections when the operating member is inserted deep into the main body.

In this fastener, when the operating member is inserted shallowly into the main body, the first stepped portions at the distal end of the cylindrical member are brought into engagement with the abutment projections on the main body, whereby the operating member is held on the main body. In that condition, by the main body being inserted into a mounting hole, the locking projections on the outer surfaces of the elastic portions are brought into engagement with a rear circumferential edge of the mounting hole, whereby the fastener is fixed in the mounting hole. In this condition, when the operating member is pushed deeper into the main body, the abutment projections are disengaged from the first stepped portions and are allowed to move on the inner wall of the cylindrical member to thereby be brought into engagement with the second stepped portions, whereby the pair of elastic portions are individually deflected inwards via the L-shaped plates on the inner surfaces of the elastic portions, as a result, the locking projections on the outer surfaces of the elastic portions are disengaged from the circumferential edge of the mounting hole, whereby the fastener can be pulled out of the mounting hole to thereby be removed therefrom.

Patent Document 1: JP-UM-H02-001525-B

DISCLOSURE OF THE INVENTION

Problem that the Invention is to Solve

In the fastener of Patent Document 1 above, since when the operating member is pushed in deeply, the pressing force is exerted on the elastic portions via the L-shaped plates, and the elastic portions are deflected inwards, whereby the locking projections are made to be disengaged from the mounting hole, the pushing-in force on the operating member is not transmitted directly to the locking projections. As a result, the release of engagement of the locking projections with the mounting hole is not performed quickly, and there is also a possibility that the locking projections cannot be disengaged from the mounting hole in an ensured fashion.

In addition, the first step portions and the second step portions are both provided on the inner wall of the cylindrical portion, and the abutment projections are made to move from the first stepped portions to the second stepped portions by the operating member being pushed in. Because of this, when the main body is inserted into the mounting hole in a state where the first stepped portions are in engagement with the abutment projections so that the operating member is held on the main body, the elastic portions are deflected inwards, and as this occurs, the abutment projections also move inwards via the L-shaped plates. Therefore, there is a fear that the abutment projections are disengaged from the first stepped portions to thereby be brought into engagement with the second stepped portions, in which case the pair of elastic portions are deflected inwards and are not brought into engagement with the circumferential edge of the rear surface of the mounting hole, resulting in a possibility that the fastener cannot be fixed in the mounting hole.

Further, when in order to remove the fastener from the mounting hole, the operating member is pushed in so that the abutment projections are brought into engagement with the second stepped portions so as to release the engagement between the locking projections and the mounting hole for the fastener to be pulled out, if the fastener is pulled in a state where the fastener is inclined obliquely, the locking projections are caught on the circumferential edge of the mounting hole, whereby the second stepped portions are disengaged from the abutment projections and the elastic portions are pushed outwards again, resulting in a fear that the fastener is not removed from the mounting hole.

Consequently, an object of the invention is to provide a fastener which not only can be fixed in a mounting hole in an ensured fashion but also can be removed from the mounting hole in a simple and ensured fashion.

Means for Solving the Problem

With a view to achieving the object, a first invention provides a fastener comprising a main body which is brought into engagement with a mounting hole formed in a mount-base part to be fixed therein and a pin member which is inserted into the main body for releasing the engagement of the main body with the mounting hole, characterized in that: the main body has a base portion which is brought into abutment with a front circumferential edge of the mounting hole and a leg portion which projects from a rear surface side of the base portion so as to be inserted into the mounting hole, the base portion having an insertion opening for the pin member provided on a front side thereof, the leg portion having a pair of facing elastic engagement pieces provided thereon for engagement with a rear circumferential edge of the mounting hole; distal end portions of the pair of elastic engagement pieces are extended towards the insertion opening for the pin member; the pin member has a head portion and an insertion portion which projects from one side thereof, the insertion portion having a pressing surface provided thereon for pressing the distal end portions of the pair of elastic engagement pieces when the pin member is inserted into the base portion to be pushed a predetermined distance thereinto so as to deflect the pair of elastic engagement pieces inwards to such an extent that the pair of elastic engagement pieces are not brought into engagement with the mounting hole; and a pin-side engagement portion and a main-body-side engagement portion are provided between the pin member and the base portion of the main body for holding the pin member in a predetermined pushed-in position when the pin member is inserted into the base portion.

According to the aforesaid invention, by inserting the pin member into the base portion of the main body, bringing the respective engagement portions into engagement with each other so as to hold the pin member in the predetermined pushed-in position and inserting the leg portion of the main body into the mounting hole in that condition so that not only the pair of elastic engagement pieces are brought into engagement with the rear circumferential edge of the mounting hole but also the base portion of the main body is brought into abutment with the front circumferential edge of the mounting hole, the fastener can be fixed in the mounting hole in the mount-base part.

In addition, when attempting to remove the fastener from the mounting hole, by pushing further the pin member into the main body, the pressing surfaces of the insertion portion of the pin member are brought into abutment with the respective distal end portions of the pair of elastic engagement pieces so as to press the distal end portions so that the pair of elastic engagement pieces can be deflected inwards via the respective distal end portions to such an extent that the pair of elastic engagement pieces are not brought into engagement with the mounting hole. By pulling the fastener out of the mounting hole in that condition, the fastener can be removed from the mounting hole.

Since as this occurs, the pressing surfaces of the pin member are made to press directly the respective distal end portions of the pair of elastic engagement pieces by the pin member being pushed into the main body, the pair of elastic engagement pieces can be deflected inwards, the removing work of the fastener can be performed smoothly.

In addition, since the engagement portion for holding the pin member in the predetermined pushed-in position is provided on the base portion, the pin member can be held in the predetermined pushed-in position in an ensured fashion without being affected by the condition of the elastic engagement pieces. As a result, the fastener can be inserted to be fixed in the mounting hole in an ensured fashion, and further, the fastener can be removed from the mounting hole in an ensured fashion.

A second invention provides a fastener as set forth in the first invention, wherein the pin-side engagement portion comprises a first pin-side engagement portion which is provided on the insertion portion of the pin member and a second pin-side engagement portion which is provided closer to a proximal end side than the first pin-side engagement portion on the insertion portion of the pin member, and wherein the pin member is held in a position where the pin member does not press the respective distal end portions of the elastic engagement pieces in a state where the first pin-side engagement portion is in engagement with the main-body-side engagement portion, while the pressing surface of the pin member press the respective distal end portions of the elastic engagement pieces so as to deflect them inwards in a state where the second pin-side engagement portion is in engagement with the main-body-side engagement portion.

According to the aforesaid invention, since the pressing surfaces of the pin member are held in the position where they do not press the respective distal end portions of the elastic engagement pieces in a state where the first pin-side engagement portion is in engagement with the main-body-side engagement portion, the pair of elastic engagement pieces are put in a condition where they are allowed to be deflected, and by inserting the leg portion into the mounting hole in that condition, the pair of elastic engagement pieces can be brought into engagement with the rear circumferential edge of the mounting hole. On the other hand, when the pin member is pushed in further from the aforesaid condition so that the second pin-side engagement portion is brought into engagement with the main-body-side engagement portion, there is produced a condition where the pressing surfaces of the pin member press the respective distal end portions of the elastic engagement pieces so as to deflect them inwards. Therefore, the fastener can be pulled out of the mounting hole.

A third invention provides the fastener of the second invention, wherein the first pin-side engagement portion comprises a projection which projects at a predetermined height from a side surface of the insertion portion, and wherein the projection has a top portion and a tapering portion which becomes smaller in height gradually towards the distal end portion, and wherein the tapering portion of the first engagement portion is brought into press contact with a predetermined portion of the base portion to thereby impart an urging force in a pull-out direction to the pin member.

According to the aforesaid invention, the pin member is pushed in so as to bring the second pin-side engagement portion into engagement with the main-body-side engagement portion, and the respective distal end portions of the elastic engagement pieces are pressed by the pressing surfaces of the pin member so as to deflect them inwards for removal of the fastener from the mounting hole. Thereafter, when the engagement of the second pin-side engagement portion with the main-body-side engagement portion is released, since the pin member is urged in the pull-out direction, the pin member can be moved smoothly in the pull-out direction so as to be easily restored to the condition where the first pin-side engagement portion is in engagement with the main-body-side engagement portion, thereby allowing the fastener to be inserted into the mounting hole to be fixed therein again.

A fourth invention provides the fastener of the second or third invention, wherein the main-body-side engagement portion comprises an opening portion which penetrates through a side wall of the base portion of the main body, and wherein the first pin-side engagement portion and the second pin-side engagement portion comprise projections which are formed on the insertion portion for engagement with an inner circumference of the opening portion.

According to the aforesaid invention, the engagement between the main-body-side engagement portion and either of the pin-side engagement portions can be released by a simple operation in which only a tool such as a screwdriver is inserted into the opening portion to push in the first pin-side engagement portion or the second pin-side engagement portion which is in engagement with the inner circumference of the opening portion, whereby the disengagement of the pin member from the main body is facilitated.

A fifth invention provides the fastener of the fourth invention, wherein a recess portion is formed on an inner circumference of the base portion for accommodating the second pin-side engagement portion in a state where the first pin-side engagement portion is in engagement with the inner circumference of the opening portion configuring the main-body-side engagement portion.

According to the aforesaid invention, since the second pin-side engagement portion is accommodated in the recess portion formed on the inner circumference of the base portion in a state where the first pin-side engagement portion is in engagement with the inner circumference of the opening portion, the second pin-side engagement portion is prevented from being pressed against the inner circumference of the base portion to thereby be deformed, and when the pin member is pushed in so as to remove the fastener, the second pin-side engagement portion can be brought into engagement with the inner circumference of the opening portion configuring the main-body-side engagement portion in an ensured fashion.

A sixth invention provides the fastener of any of the first to fifth inventions, wherein the insertion portion of the pin member is formed to be divided by a slit which extends in an axial direction, and wherein a partition wall is provided inside the base portion of the main body so as to extend along the axial direction to thereby enter the slit in the pin member when the pin member is inserted into the main body.

According to the aforesaid invention, since the slit is provided in the insertion portion, the insertion portion is easily deflected for easy insertion into the base portion when the insertion portion is inserted into the base portion. Further, since the partition wall provided on the main body enters the slit, the insertion portion is guided by the partition wall, whereby the pin member can be inserted into the main body in a proper posture.

A seventh invention provides the fastener of the sixth invention, wherein the partition wall of the main body is situated between the pair of elastic engagement pieces when viewed in the axial direction, and wherein the insertion portion of the pin member is divided into two portions so that respective distal end faces of the two divided portions of the insertion portion configure sloping surfaces of which an inner slit side is made smaller in height and which are made to project to become gradually taller in height towards an outer side thereof, the sloping surfaces configuring the pressing surface.

According to the aforesaid invention, since the partition wall situated between the pair of elastic engagement pieces enters the slit which defines the two divided pressing surfaces, the pressing surfaces can be brought into abutment with the distal end portions in the proper posture in an ensured fashion. In addition, since the projecting distal end portions of the pair of elastic engagement pieces can be pressed against by the sloping pressing surfaces which are provided at the respective distal ends of the insertion portion while guiding them inwards, the pair of elastic engagement pieces can be deflected inwards in an ensured fashion.

An eighth invention provides the fastener of any of the first to seventh inventions, wherein a strip wall disposed to extend in the axial direction along the insertion portion is provided on the pin member, and wherein the pin-side engagement portions are formed on the strip wall.

According to the aforesaid invention, since the pin-side engagement portions are provided on the strip wall, when the insertion portion of the pin member is inserted into the base portion of the main body, the strip wall can easily be deflected so as to facilitate the insertion of the insertion portion, thereby enabling to improve workability in inserting the pin member into the main body.

A ninth invention provides the fastener of the eighth invention, wherein the strip wall is made up of a pair of strip walls which are disposed side by side, and wherein the first pin-side engagement portion is provided on one of the pair of strip walls and the second pin-side engagement portion is provided on the other.

According to the aforesaid invention, since a deflection of the first pin-side engagement portion and a deflection of the second pin-side engagement portion are performed independently, engagements of the respective engagement portions with the main-body-side engagement portion are implemented in an ensured fashion.

A tenth invention provides the fastener of the eighth or ninth invention, wherein the insertion portion is made up of a pair of pillar pieces which extend a predetermined length from one side of the head portion and bent portions which are made by bending distal ends of the pillar pieces in a direction in which they approach each other or in a direction in which they are apart from each other into a substantially L-shape, and wherein the pressing surface is provided on an outer surface of each of the bent portions and the strip walls are formed so as to connect the bent portions to the head portion.

According to the aforesaid invention, the configuration of the insertion portion can be made relatively simple, and in association therewith, the shapes of molds for molding the pin member can be made simple to thereby reduce the production costs.

An eleventh invention provides the fastener of any of the first to tenth inventions, wherein guide grooves into which the insertion portion enters are provided on facing side walls of the base portion in positions which are aligned with the pair of elastic engagement pieces so as to extend along an axial direction of the base portion.

According to the aforesaid invention, since side walls of the insertion portion enter the guide grooves on the base portion to thereby be guided when the insertion portion of the pin member is inserted into the base portion of the main body, the insertion portion can smoothly be inserted into the base portion. In addition, since the width of the insertion portion can be expanded so as to widen the pressing surfaces by the guide grooves which the side walls of the insertion portion enters being provided on the base portion, the pressing surfaces are made easy to press the respective projecting portions of the pair of elastic engagement pieces.

A twelfth invention provides the fastener of the second invention, wherein the first pin-side engagement portion is disposed on one side surface of the insertion portion of the pin member and the second pin-side engagement portion is disposed on another side surface which intersects substantially at right angles to the one side surface, and wherein a first body-side engagement portion with which the first pin-side engagement is brought into engagement and a second main-body-side engagement portion with which the second pin-side engagement portion is brought into engagement are provided on the main body.

According to the aforesaid invention, by disposing the first pin-side engagement portion and the second pin-side engagement portion on the separate side surfaces which are disposed to intersect each other substantially at right angles, an outside diameter of the insertion portion can be formed relatively small, whereby the pin member and the whole of the fastener can be made compact.

A thirteenth invention provides the fastener of the twelfth invention, wherein a pressing force required when the second pin-side engagement portion is brought into engagement with the second main-body-side engagement portion is set larger than a pressing force required when the elastic engagement pieces are deflected so as to be brought into engagement with the mounting hole.

According to the aforesaid invention, when the head portion of the pin member is pressed by a finger so that the leg portion of the main body is inserted into the mounting hole in such a state the first pin-side engagement portion is in engagement with the first main-body-side engagement portion, since the pressing force required when the second pin-side engagement portion is brought into engagement with the second main-body-side engagement portion is set larger than the pressing force required when the elastic engagement pieces are deflected so as to be brought into engagement with the mounting hole, it can be prevented that the pin member is pushed further into the main body, so that the pressing surfaces of the insertion portion press the respective distal end portions of the elastic engagement pieces to deflect them inwards.

A fourteenth invention provides the fastener of the twelfth or thirteenth invention, wherein the insertion portion has a pair of plate-shaped pieces which are extended from side surfaces thereof, and wherein the first pin-side engagement portion is disposed at distal ends of the pair of plate-shaped pieces.

According to the aforesaid invention, since the first pin-side engagement portion is disposed at the distal ends of the plate-shaped pieces, when the pin member is inserted into the main body, the inserting resistance is reduced by the plate-shaped pieces being deflected, whereby the pin member can smoothly be pushed in.

A fifteenth invention provides the fastener of any of the twelfth to fourteenth inventions, wherein elastic walls are provided on the insertion portion which connect both side portions of the pressing surface and the head portion and which have voids at an inner diameter side, and wherein the second pin-side engagement portion is provided on the elastic walls.

According to the aforesaid invention, since the elastic walls extend from both the side portions of the pressing surface, the width of the pressing surface can be widened, so that the distal end portions of the elastic engagement pieces can be easily pressed. In addition, since the elastic walls are easily deflected by the voids provided at the inner diameter side, the second pin-side engagement portion can be easily brought into engagement with the second main-body-side engagement portion.

A sixteenth invention provides the fastener of any of the twelfth to fifteenth inventions, wherein the leg portion of the main body has a cylindrical shape having an opening at a distal end, and wherein the first main-body-side engagement portion is provided at an edge portion of the opening at the distal end of the leg portion.

According to the aforesaid invention, when the fastener is removed from the mounting hole by pushing in the pin member so as to deflect the elastic engagement pieces and bringing the second pin-side engagement portion with the second main-body-side engagement portion, since the first pin-side engagement portion is positioned at the edge-portion of the opening at the distal end of the leg portion, the engagement of the second pin-side engagement portion with the second main-body-side engagement portion can easily be released by pushing in the first pin member from a distal end side of the leg portion of the main body, whereby the pin member can easily be restored to its original position.

A seventeenth invention provides the fastener of the sixteenth invention, wherein a cutout is formed at the edge portion of the opening at the distal end of the leg portion, and wherein the first main-body-side engagement portion is provided inside the cutout.

According to the aforesaid invention, since the first main-body-side engagement portion is provided inside the cutout formed at the edge portion of the opening at the distal end of the leg portion, a distal end of the pin member can be made not to project further than the distal end of the leg portion in a state where the first pin-side engagement portion is in engagement with the first main-body-side engagement portion, whereby the engaged condition can be prevented from being released abruptly by an external force.

In addition, when the fastener is removed from the mounting hole by pushing in the pin member so as to deflect the elastic engagement pieces and bringing the second pin-side engagement portion with the second main-body-side engagement portion, the distal end of the first pin member can easily be pushed by inserting a tool into the cutout, so that the engagement of the second pin-side engagement portion with the second main-body-side engagement portion can easily be released, whereby the pin member can easily be restored to its original position.

An eighteenth invention provides the fastener of any of the twelfth to seventeenth inventions, wherein the insertion portion has such a length that a distal end of the insertion portion does not project from the distal end of the leg portion when the first pin-side engagement portion is in engagement with the first main-body-side engagement portion but projects from the distal end of the leg portion when the second pin-side engagement portion is in engagement with the second main-body-side engagement portion.

According to the aforesaid invention, since the distal end of the insertion portion of the pin member projects from the distal end of the leg portion in a state where the second pin-side engagement portion is in engagement with the second main-body-side engagement portion, by pushing the distal end of the insertion portion of the pin member into the leg portion, the engagement of the second pin-side engagement portion with the second main-body-side engagement portion can easily be released without using a tool.

A nineteenth invention provides the fastener of any of the twelfth to eighteenth inventions, wherein a cutout groove is provided on the insertion opening provided in the base portion of the main body, and wherein the second pin-side engagement portion of the pin member is brought into engagement with the cutout groove.

According to the aforesaid invention, since the second pin-side engagement portion of the pin member can be inserted through the cutout groove on the insertion opening, the second pin-side engagement portion can be formed to project from an outer circumference of the insertion portion of the pin member, whereby the pressing surfaces provided on the insertion portion can be formed wide.

A twentieth invention provides the fastener of any of the twelfth to nineteenth inventions, wherein the second pin-side engagement portion is brought into abutment with the inner circumference of the base portion in a deflected condition in a state where the first pin-side engagement portion is in engagement with the first main-body-side engagement portion.

According to the aforesaid invention, since the second pin-side engagement portion is brought into abutment with the inner circumference of the base portion in the deflected condition in a state where the first pin-side engagement portion is in engagement with the first main-body-side engagement portion, the pin member can be held in the main body without any looseness.

A twenty-first invention provides the fastener of the seventeenth invention, wherein the cutout is formed in facing side surfaces at the distal end of the cylindrical leg portion, and wherein facing surfaces where the cutout is not formed are connected by a bridge wall.

According to the aforesaid invention, since the side surfaces at the distal end of the leg portion where no cutout is formed are connected to each other by the bridge wall, the rigidity at the distal end of the leg portion can be improved, and further, the first pin-side engagement portion which is in engagement with the cutout can be protected against an external force which is applied thereto abruptly.

Advantage of the Invention

According to the fastener of the invention, when the leg portion of the main body is inserted into the mounting hole in a state where the pin member is inserted into the base portion to be held in the predetermined pushed-in position, the pair of elastic engagement pieces are brought into engagement with the rear circumferential edge of the mounting hole, and the base portion is brought into abutment with the front circumferential edge of the mounting hole, whereby the fastener can be fixed in the mounting hole in the mount-base part. When the pin member is pushed further in this condition, the pressing surfaces of the insertion portion press the respective distal end portions of the pair of elastic engagement pieces to thereby deflect them to such an extent that the pair of elastic engagement pieces are not brought into engagement with the mounting hole, whereby the fastener can be pulled out for removal from the mounting hole.

Since as this occurs, by pushing the pin member into the main body, the pressing surfaces of the pin member are made to press directly the respective distal end portions of the pair of elastic engagement pieces, the pair of elastic engagement pieces can be deflected inwards in an ensured fashion, whereby the removing work of the fastener can smoothly be performed.

In addition, since the engagement portions are provided on the base portion for holding the pin member in the predetermined pushed-in position, the pin member can be held in the predetermined pushed-in position without being affected by the condition of the elastic engagement pieces. As a result, the fastener can be inserted to be fixed in the mounting hole in an ensured fashion, and further the fastener can be removed from the mounting hole in an ensured fashion.

BEST MODE FOR CARRYING OUT THE INVENTION

Hereinafter, referring to FIGS. 1 to 6B, an embodiment of a fastener of the invention will be described.

As is shown in FIG. 1, a fastener 10 of the invention is used to mount, for example, a mounting-subject part such as a so-called convenience hook where a shopping bag can be hung on a mount-base part such as a body panel 1 installed on a side wall inside a vehicle by being inserted into a quadrangular mounting hole 2 formed in the mount-base part so as to fix the mounting-subject part so that the fastener 10 is removed from the mounting hole 2 as required. The fastener 10 of the invention is not limited to the form described above but can be used in mounting detachably a mounting-subject part such as a garnish or a trim board on a mount-base part such as a vehicle body panel.

As is shown in FIG. 1, a round hole-like rotation preventive hole 3 is provided in the body panel 1 as a mount-base part so as to be spaced a predetermined interval apart from the mounting hole 2. A trim member 5 is disposed on a front side of the body panel 1, and a quadrangular insertion hole 6, which is larger in size than the mounting hole 2, is formed in the trim member 5 in a position aligned with the mounting hole 2. Similarly, a round hole-like insertion hole 7, which is larger in size than the rotation preventive hole 3, is formed in the trim member 5 in a position aligned with the rotation preventive hole 3.

In addition, as is shown in FIGS. 1 and 2, the fastener 10 includes a main body 20 which is brought into engagement with the mounting hole 2 formed in the body panel 1 so as to be fixed therein and a pin member 40 which is inserted into the main body 20 for releasing the engagement of the main body 20 with the mounting hole 2.

The main body 20 will be described by reference to FIGS. 1 to 3C and 5A to 6B. This main body 20 has a base portion 21 which is brought into abutment with a front circumferential edge of the mounting hole 2 and a leg portion 30 which projects from a rear surface side of the base portion so as to be inserted into the mounting hole. In the case of this embodiment, the base portion 21 is made up of a base plate 22 which has a long plate-like shape and includes an insertion opening 23 provided at one length-wise end portion and an angular cylindrical accommodation portion 25 which projects from a circumferential edge of the insertion opening 23 to a predetermined height on a rear side of the one length-wise end portion of the base plate 22 so as to be inserted through the insertion hole 6 in the trim member 5. The insertion opening 23 has a round hole-like shape to match a head portion 41 of a pin member 40 (which will be described later) and an insertion portion 43 of the pin member 40 is to be inserted from a front side of the base portion 21 through the insertion opening 23.

In addition, as is shown in FIG. 3A, when the insertion opening 23 is viewed in an axial direction, a pair of arc-shaped projecting portions 23a, 23a are formed to project from left and right inner circumferences of the insertion opening 23 on a far side thereof. The pair of left and right arc-shaped projecting portions 23a, 23a are connected by a partition wall 24 which is provided to extend across a center C1 (refer to FIG. 3A) of the insertion opening 23 so as to form a substantially H-shape when viewed in the axial direction. The insertion opening 23 is divided into two by the partition wall 24, so that the insertion portion 43 of the pin member 40 (which will be described later) which is divided into two is guided into divided spaces 25a, 25a (which will be described later) of the accommodation portion 25. The partition wall 24 extends along the axial direction within the accommodation portion 25 and further extends along the axial direction also within the leg portion 30, so as to be connected to a bottom wall 33 (which will be described later). In addition, when inserting the insertion portion 43 of the pin member 40 into the main body 20, the partition wall 24 enters inside a slit 46 (which will be described later) provided in the pin member 40.

Further, as is shown in FIG. 3A, cutout portions 23b, 23b are provided on inner circumferences of the pair of arc-shaped projecting portions 23a, 23a so as to match the width of the insertion portion 43 (which will be described later). In addition, as is shown in FIGS. 3A to 3C, recess portions 23c, 23c are provided adjacent to the partition wall 24 inside the left and right cutout portions 23b, 23b in positions which face each other across the partition wall 24 in an oblique direction with respect to the center C1 of the insertion opening 23. These recess portions 23c, 23c are portions where second pin-side engagement portions 58 are accommodated when first pin-side engagement portions 57 of the pin member 40 (which will be described later) are brought into engagement with proximal inner circumferential edges of opening portions 26*a* (which will also be described later) as is shown in FIG. 5B.

In addition, a hook portion 22*a* is provided to extend forwards a predetermined length from a front surface side of the other length-wise end portion of the base plate 22 and to bend back towards the one length-wise end portion side so as to be formed into a substantially L-shape. A handle portion of a shopping bag is hooked on the hook portion 22*a* so that the shopping bag can be hung therefrom.

The angular cylindrical accommodation portion 25, which projects from the rear circumferential edge of the insertion opening 23 in the base plate 22, has a pair of side walls 26, 26 which are provided side by side and guide walls 27, 27 which are formed on both side portions of each of the side walls 26, into a substantially L-shape in section and with a predetermined width. Further, the partition wall 24, which extends from inside the insertion opening 23, extends along an axial direction of the accommodation portion 25, and the partition wall 24 is connected to axial centers of the pair of side walls 26, 26 substantially at right angles. As a result, the two equally divided spaces 25*a*, 25*a* are defined inside the accommodation portion 25 (refer to FIG. 3B), and the divided insertion portion 43 of the pin member 40 is inserted into the insertion opening divided into the respective spaces 25*a*, 25*a*.

In addition, as is shown in FIGS. 2 and 3B, rectangular opening portions 26*a*, 26*a* are individually provided at proximal sides of the pair of side walls 26, 26 in positions which are rotationally symmetric with each other with respect to the center C1 of the insertion opening (refer to FIG. 3A) so as to penetrate through the side walls 26. This opening portion 26*a* is referred to as the main-body-side engagement portion of the invention and configures a portion with which the pin-side engagement portion of the pin member 40 is brought into engagement. Specifically, the first pin-side engagement portion 57 and the second pin-side engagement portion which make up the pin-side engagement portion are brought into engagement with a proximal inner circumferential edge of the opening portion 26*a* in accordance with a pushed-in amount of the pin member 40.

On the other hand, guide grooves 27*a*, 27*a* with a predetermined width are provided between the pairs of facing guide walls 27, 27 which are provided at both the side portions of the respective side walls 26, 26 so as to extend along the axial direction. When inserting the pin member 40 into the main body 20, pillar pieces 44, 44 of the insertion portion 43 of the pin member 40 (which will be described later) enter the guide grooves 27*a*, 27*a*, and the guide grooves 27*a*, 27*a* guide the pin member 40 which is being inserted.

The angular cylindrical leg portion 30, which is inserted into the mounting hole 2, projects from the rear surface side of the base portion 21, that is, a distal end portion of the angular cylindrical accommodation portion 25. This leg portion 30 has a bottomed angular cylindrical shape which is made up of a pair of side walls 31, 31 which project from distal end faces of the pair of side walls 26, 26 which make up the accommodation portion 25 at an interval which is narrower than an interval at which the side walls 26, 26 are spaced apart and at a predetermined height, a pair of connecting walls 32, 32 which connect end portions of the respective side walls 231, 31 and the bottom wall 33 which connect distal end portions of the respective walls 31, 32. In addition, the partition wall 24 extends along the axial direction so as to connect width-wise central portions of inner surfaces of the pair of side walls 31, 31, and a distal end of the partition wall 24 connects to the bottom wall 33. In addition, an outer circumference of a distal end of the leg portion 30 is cut obliquely to form a chamfered portion 30*a*, which facilitates the insertion of the leg portion 30 into the mounting hole 2.

Referring to FIGS. 2 and 3A to 3C, slits 34 are formed to extend along the axial direction on each of the pair of connecting walls 32, 32, and a pair of elastic engagement pieces 35, 35 are provided so as to be deflectable inwards and outwards of the leg portions 30 via the slits 34, 34. Each elastic engagement piece 35 is connected to the connecting wall 32 at a proximal end portion thereof, is formed into a shape which extends obliquely outwards towards the base portion 21 and has on an outer surface thereof a tapering surface 35*a* which gradually projects outwards as it extends towards the base portion 21, a top portion 35*b* which projects most outwards of the tapering surface 35*a* and an engagement stepped portion 35*c* whose projecting height is gradually reduced from the top portion 35*b* to such an extent that the engagement stepped portion 35*c* is brought into engagement with the rear circumferential edge of the mounting hole 2. Then, distal end portions 37, 37 project towards the base portion 21 individually from inner circumferential sides of the respective engagement stepped portions 35*c* of the pair of elastic engagement pieces 35, 35. Namely, the respective distal end portions 37, 37 are extended towards a front side of the mounting hole 2. Further, in other words, the respective distal end portions 37, 37 are extended towards the insertion opening 23 formed in the main body 20 for insertion of the pin member 40.

In the case of this embodiment, as is shown in FIG. 5A, when the pair of elastic engagement pieces 35, 35 are individually brought in engagement with the rear circumferential edge of the mounting hole 2, the distal end portions 37, 37 enter inside the mounting hole 2 and then project from the front side of the mounting hole 2, as a result, when the pin member 40 is pushed into the main body 20, the distal end portions are pressed against by pressing surfaces 48 (which will be described later) of the pin member 40, whereby the pair of elastic engagement pieces 35, 35 are deflected inwards (refer to FIG. 6A). Further, as is shown in FIG. 3B, an outer surface of each distal end portion 37 has a first tapering surface 37*a* whose projecting height is gradually reduced as it extends from the engagement stepped portion 35*c* towards a distal end thereof and a second tapering surface 37*b* which slopes down from an end portion of the first tapering surface 37*a* at an angle which is less steep than the first tapering surface 37*a*. These tapering surfaces 37*a*, 37*b* facilitate the pressing of the distal end portions 37, 37 by the pressing surfaces 48 of the pin member 40 when the pin member 40 is pushed inwards in a state where the pair of elastic engagement pieces 35, 35 are in engagement with the rear circumferential edge of the mounting hole 2 as is shown in FIG. 5B.

In addition, a cylindrical portion 38 projects from a rear side of the other length-wise end portion of the base plate 22 so as to be inserted through the round hole-like insertion hole 7 in the trim member 5, and a rotation preventive projection 39, having a tapering surface which tapers distally around an outer circumference at a distal end thereof, projects from a distal end of the cylindrical portion 38, and this rotation preventive projection 39 is inserted through the rotation preventive hole 3 in the body panel 1, whereby the fastener 10 is fixed in the mounting hole 2 in a state where the fastener 10 is prevented from rotating.

Next, referring to FIGS. 1, 2 and 4A to 6B, the pin member 40 which is assembled into the main body 20 will be described. This pin member 40 has the circular head portion 41 which fits in the insertion opening 23 and the insertion portion 43 which projects from one side of the head portion 41.

As is shown in FIGS. 2 and 4B, the insertion portion 43 of this embodiment is made up of the pair of pillar pieces 44, 44 which extend a predetermined length from facing positions on a rear circumferential edge of the head portion 41 and bent portions 45, 45 which are bent into a substantially L-shape in a direction in which distal ends of the pillar pieces 44, 44 approach each other and the insertion portion 43 has a shape in which it is divided into two by a slit 46 which extends in the axial direction. In addition, a pair of pressing projections 47, 47 are provided on outer surfaces of the bent portions 45, 45 so as to project therefrom. A distal end-face of each pressing projection 47 forms a sloping surface which is lower on an inner slit 46 side and which gradually projects higher towards an outer side thereof, and when the insertion portion 43 is viewed from a side thereof, the pressing projection 47 has a shape which expands into a substantially inverted V-shape (refer to FIGS. 2 and 4A to 4C). The respective sloping surfaces of the pressing projections 47, 47 configure the pressing surfaces 48, 48 of the invention.

Then, by inserting the insertion portion 43 of the pin member 40 into the accommodation portion 25 through the insertion opening 23 in the main body 20 and pushing it in a predetermined distance, the respective pressing surfaces 48, 48 of the insertion portion 43 can press the respective distal end portions 37, 37 of the pair of elastic engagement pieces 35, 35 so as to deflect the pair of elastic engagement pieces 35, 35 inwards to such an extent that they are not brought into engagement with the rear circumferential edge of the mounting hole 2 (refer to FIG. 6A).

In addition, as is shown in FIG. 5A, a distance D1 between top portions of the respective pressing surfaces 48, 48 of the pressing projections 47, 47 which project highest is set larger than a distance D2 between the respective distal end portions 37, 37 of the pair of elastic engagement pieces 35, 35 (D1>D2), whereby when pushing in the pin member 40, the respective distal end portions 37, 37 are easily guided by the inverted V-shaped pressing surfaces 48, 48.

Although the pressing surfaces 48, 48 of this embodiment have the substantially inverted V-shape, the shape of the pressing surfaces 48, 48 is not limited to that specific shape, and hence, there may be adapted any shape capable of pressing the respective distal end portions 37, 37 so as to deflect the pair of elastic engagement pieces 35, 35 inwards. For example, by forming the outer surface of the distal end portion 37 of the elastic engagement piece 35 into a tapering surface which slopes down inwards, if the pressing surface 48 is formed into a flat plane perpendicular to the pushing-in direction of the pin member 40, the pressing surfaces 48, 48 can deflect the pair of elastic engagement pieces 35, 35 inwards. In addition, by forming the pressing surface 48 into the substantially inverted V-shape as has been described above, if the outer surface of the distal end portion 37 of the elastic engagement piece 35 is not formed into the tapering surface but is formed into a plane which is parallel to the pushing-in direction of the pin member 40, the pressing surfaces 48, 48 still can deflect the pair of elastic engagement pieces 35, 35 inwards.

As is shown in FIG. 2, projecting pieces 55 are formed individually on both sides of the bent portions 45 of the insertion portion 43, and strip walls 50 extending in the axial direction are connected between a pair of projecting pieces 55 in those projecting pieces 55 which are disposed to face each other in positions which are rotationally symmetrical with respect to an axial center C3 of the insertion portion 43 (refer to FIG. 4C) and the head portion 41. The strip wall 50 is made up of a first strip wall 51 and a second strip wall 53 which are disposed side by side via a slit 52. The first strip wall 51 is positioned on a proximal side of the bent portion 45, and the second strip wall 53 is positioned on a distal end side of the bent portion 45. In addition, a width T2 of the second strip wall 53 is wider than a width T1 of the first strip wall 51, and appropriate flexibilities are imparted to the strip walls.

In addition, the first pin-side engagement portion 57 is provided on the first strip wall 51 in a position closer to the bent portion 45 than an axial center. This first pin-side engagement portion 57 has a top portion 57a which projects highest, a tapering portion 57b which gradually becomes smaller in height from the top portion 57a towards a distal end portion of the insertion portion 43 and an engagement portion 57c which is provided on an opposite side to the tapering portion 57b across the top portion 57a.

On the other hand, the second pin-side engagement portion 58 is provided on the second strip wall 53 in a position closer to the head portion 41 than an axial center thereof, and similarly to the first pin-side engagement portion 57, the second pin-side engagement portion 58 has a top portion 58a, a tapering portion 58b which gradually becomes smaller in height from the top portion 58a towards the distal end portion of the insertion portion 43 and an engagement portion 58c which is provided on an opposite side to the tapering portion 58b across the top portion 58a. In addition, the first pin-side engagement portion 57 and the second pin-side engagement portion configure the pin-side engagement portion of the invention.

Then, when the pin member 40 is pushed into or pulled out of the main body 20, the pin-side engagement portion of the invention which are made up of the first pin-side engagement portions 57 and the second pin-side engagement portions 58 is brought into engagement with the opening portions 26a configuring the main-body-side engagement portion of the main body 20, so as to hold the pin member 40 in a predetermined pushed-in position.

Specifically, when the pin member is pushed shallowly into the main body 20, as is shown in FIG. 5B, the engagement portion 57c of the first pin-side engagement portion 57 is brought into engagement with the proximal inner circumferential edge of the opening 26a, and the second pin-side engagement portion 58 enters inside the recess portion 23c. As this occurs, as is shown in FIG. 5A, the pressing surfaces 48, 48 are not in abutment with the respective distal end portions 37, 37 of the elastic engagement pieces 35, 35, and the pressing surfaces 48 are held in a position where they do not press the respective distal end portions 37, whereby the pin member 40 is held in the main body 20 in a state where the pair of elastic engagement pieces 35, 35 are allowed to be deflected inwards and outwards.

On the other hand, when the pin member 40 is pushed in deeply from the aforesaid condition, as is shown in FIG. 6B, the engagement portion 58c of the second pin-side engagement portion 58 of the second strip wall 53 is brought into engagement with the proximal inner circumferential edge of the opening portion 26a. As this occurs, since the tapering portion 57b of the first pin-side engagement portion 57 is brought into press contact with a distal inner circumferential edge of the opening portion 26a, an urging force in a direction in which the pin member 40 is pulled out of the main body 20 is imparted to the pin member 40.

Next, a method for using the fastener 10 of the invention having the above-described configuration will be described.

Firstly, as is shown in FIGS. 1 and 2, the pillar pieces 44, 44 of the pin member 40 being aligned with the guide grooves 27a, 27a on the main body 20, the pin member 40 is pushed into the main body 20 from the insertion opening 23 on the front side of the base portion 21.

Then, the pillar pieces 44, 44 enter the guide grooves 27a, 27a, so that the pillar pieces 44, 44 are guided, and the partition wall 24 provided within the main body 20 enters the slit 46 in the insertion portion 43, whereby while the insertion portion 43 is also being guided by the partition wall 24, the insertion portion 43, which is divided into two, enter the spaces 25a, 25a in the accommodation portion 25 through the insertion opening 23. As this occurs, since the pillar pieces 44, 44 of the insertion portion 43 enter the guide grooves 27a on the base portion 21 to thereby be guided, the insertion portion 43 can smoothly be inserted into the base portion 21. In addition, since the partition wall 24 enters the slit 26 to guide the insertion portion 43, the pin member 40 can be inserted into the main body 20 with a proper posture without being inclined.

When the pin member 40 is pushed inwards in the way described above, the first pin-side engagement portions 57 which are formed on the first strip walls 51 are brought into press contact with inner circumferential edges of the cutout portions 23b, 23b of the arc-shaped projecting portions 23a, 23a shown in FIGS. 3A to 3C to thereby be deflected inwards. Then, when the top portions 57a ride over the proximal inner circumferential edges of the opening portions 26a in the accommodation portion 25, the engagement portions 57c of the first pin-side engagement portions 57 are brought into engagement with the proximal inner circumferential edges of the opening portions 26a as is shown in FIG. 5B. As this occurs, as is shown in FIG. 5A, the pressing surfaces 48, 48 of the pin member 40 are not in abutment with the respective distal end portions 37, 37 of the elastic engagement pieces 35, 35, whereby the pin member 40 is held in the main body 20 in a state where the pair of elastic engagement pieces 35, 35 are allowed to be deflected inwards and outwards.

In addition, in the aforesaid condition, the second pin-side engagement portions 58 formed on the second strip walls 53 are accommodated in the recess portions 23c on the inner circumference of the base portion 21. Because of this, it is prevented that the second pin-side engagement portions 58 are pressed by the inner circumference of the base portion 21 so that the second strip walls 53 are prevented from being strained and deformed, and when the pin member is pushed in as will be described later so as to remove the fastener 10 from the mounting hole 2, the second pin-side engagement portions 58 can be brought into engagement with the proximal inner circumferential edges of the opening portions 26a in an ensured fashion.

Next, in a state where the respective insertion holes 6, 7 in the trim member 5 are aligned with the mounting hole 2 and the rotation preventive hole 3 in the body panel 1, the trim member 5 is installed on the body panel 1 (refer to FIG. 1), the leg portion 30 of the fastener 10 is aligned with the mounting hole 2, and the rotation preventive projection 39 is aligned with the rotation preventive hole 3 for subsequent insertion.

Then, the leg portion 30 of the main body 20 passes through the insertion hole 6 in the trim member 5 and is inserted into the mounting hole 2. Then, when the elastic engagement pieces 35 provided on the leg portion 30 are pressed by the inner circumference of the mounting hole 2 to be deflected inwards and pass through the mounting hole 2, the elastic engagement pieces 35 are brought into engagement with the rear circumferential edge of the mounting hole 2. In addition, the distal end face of the accommodation portion 25 of the base portion 21 is brought into abutment with the front circumferential edge of the mounting hole 2, whereby the main body 20 is fixed while the body panel 1 is held by the elastic engagement pieces 35 and the base portion 21. In addition, the rotation preventive projection 39 of the main body 20 is inserted through the rotation preventive hole 3, whereby the rotation of the main body 20 is prevented. Thus, the hook having the fastener 10 can be fixed to the body panel 1.

Then, when the fastener 10 is desired to be removed from the mounting hole 2 for replacing hooks having a fastener 10, servicing the vehicle for maintenance or disposal of the vehicle, the pin member 40 is pushed into the main body 20. Then, the substantially inverted V-shaped pressing surfaces 48, 48 are brought into abutment with the second tapering surfaces 37b and the first tapering surfaces 37a of the respective distal end portions 37, 37 of the pair of elastic engagement pieces 35, sequentially to thereby press the respective distal end portions 37, 37 while guiding them inwards so as to hold them therebetween, whereby the pair of elastic engagement pieces 35, can be deflected via the respective distal end portions 37, 37 to such an extent that the pair of elastic engagement pieces 35, 35 are not brought into engagement with the mounting hole 2 (refer to FIG. 6A).

As this occurs, by pushing in the pin member 40, the second pin-side engagement portions 58 of the second strip walls 53 are brought into engagement with the proximal inner circumferential edge of the openings 26a, and the pin member 40 can be held in the pushed-in position. Consequently, by pulling out the fastener 10 in this condition, the fastener 10 can be removed from the mounting hole 2 in the body panel 1. Then, since the pin member 40 is held in the pushed-in position by the engagement of the second pin-side engagement portions 58 with the opening portions 26a, the inwardly deflected condition of the pair of elastic engagement pieces 35, 35 can be prevented from being released in the midst of removal of the fastener 10 from the mounting hole 2, thereby enabling to perform the removing work in an easy and ensured fashion.

In addition, in this embodiment, since the partition wall 24 positioned between the pair of elastic engagement pieces 35, enter the slit 46 which defines the two pressing surfaces 48, the respective pressing surfaces 48, 48 can be brought into abutment with the respective distal end portions 37, 37 with the proper posture and in an ensured fashion. In addition, since the respective distal end portions 37, 37 of the pair of elastic engagement pieces 35, 35 can be pressed while being guided inwardly by the substantially inverted V-shaped pressing surfaces 48, 48 which are provided at the distal end of the insertion portion 43, the pair of engagement pieces 35, 35 can be deflected inwards in an ensured fashion.

Further, in this embodiment, since the first pin-side engagement portions 57 and the second pin-side engagement portions 58 are provided, respectively, on the first trip walls 51 and the second strip walls 53 which are provided on the pin member 40, when the insertion portion 43 of the pin member 40 is inserted into the base portion 21 of the main body 20, the strip walls 51, 53 are deflected to facilitate the insertion of the insertion portion 43, thereby enabling to improve the workability in inserting the pin member 40 into the main body 20.

In addition, in this embodiment, the strip wall 50 is made up of the pair of strip walls 51, 53 which are disposed side by side and the first pin-side engagement portion 57 is provided on the first strip wall 51, while the second pin-side engagement portion 58 is provided on the second strip wall 53. Therefore, the deflection of the first pin-side engagement portion 57 and the deflection of the second pin-side engagement portion 58 are performed independently, whereby the engagement of the individual pin-side engagement portions 57, 58 with the proximal inner circumferential edge of the opening 26a can be implemented in an ensured fashion.

Further, in this embodiment, the width of the insertion portion 43 can be widened by providing the guide grooves 27a, 27a into which the pair of pillar pieces 44, 44 of the insertion portion 43 enter in the accommodation portion 25. As a result, the pressing surfaces 48 can be widened so that the pressing surfaces 48 easily press the respective distal end portions 37, 37 of the pair of elastic engagement pieces 35, 35.

In addition, in this fastener 10, by pushing the pin member 40 into the main body 20, the pressing surfaces 48 of the pin member 40 press directly the respective distal end portions 37, 37 of the pair of elastic engagement pieces 35, 35 so as to deflect the pair of elastic engagement pieces 35, 35 inwards to such an extent that they are not brought into engagement with the mounting hole 2. Therefore, the removing work of the fastener 10 can be performed smoothly.

Additionally, since the main-body-side engagement portion (in this embodiment, the opening portions 26a) for holding the pin member 40 in the predetermined pushed-in position is provided on the base portion 21, the pin member 40 can be held in the predetermined pushed-in position in an ensured fashion without being affected by the condition of the elastic engagement pieces 35.

When the fastener 10 removed from the mounting hole 2 is fixed in the mounting hole 2 again, the pin member 40 may be pulled back from the pushed-in position shown in FIGS. 6A and 6B to the pushed-in position shown in FIGS. 5A and 5B so that the pair of elastic engagement pieces 35, 35 are put back in the condition where they can be deflected inwards and outwards. As this occurs, in this embodiment, since the opening portions 26a are provided to penetrate through the side walls 26 of the accommodation portion 25 so that the second pin-side engagement portions 58 are brought into engagement with the opening portions 26a, the engagement of the second pin-side engagement portions 58 with the proximal inner circumferential edges of the opening portions 26a can be released by a simple operation of inserting a distal end of a tool such as a flathead screwdriver into the opening portion 26a to push in an outer surface of the second pin-side engagement portion 58. As a result, the pair of elastic engagement pieces 35, 35 can be put back in the condition where they can be deflected inwards and outwards, thereby enabling to realize a reuse of the fastener 10.

In addition, in this embodiment, with the pin member 40 held in the main body 20 in such a condition that the pair of elastic engagement pieces 35, 35 are deflected inwards to such an extent that they are not brought into engagement with the mounting hole 2, the tapering portions 57b of the first pin-side engagement portions 57 are in press contact with the distal inner circumferential edges of the opening portions 26a so as to impart the urging force in the direction in which the pin member 40 is pulled out to the pin member 40 (refer to FIG. 6B). Because of this, when the engagement of the second engagement portions 58 with the proximal inner circumferential edges of the opening portions 26a is released in the way described above, the pin member 40 is moved smoothly in the direction in which the pin member 40 is pulled out, whereby the condition shown in FIG. 5B can easily be restored in which the first pin-side engagement portion 57 is in engagement with the proximal inner circumferential edge of the opening portion 26a, thereby enabling to realize a reuse of the fastener 10 more effectively.

Further, in this embodiment, the insertion portion 43 is made up of the pair of pillar pieces 44, 44 and the bent portions 45, 45 which are bent into the substantially L-shape in the direction in which the distal ends of the pillar pieces 44, 44 approach each other, and further, the pressing surfaces 48 are provided on the outer surfaces of the bent portions 45, the strip walls 50 being formed to connect between the bent portions 45 and the head portion 41. Therefore, the configuration of the insertion portion 43 can be made relatively simple, and in association with this, the shapes of the molds for use in molding the pin member 40 can be made simple, thereby enabling to reduce the production costs.

FIGS. 7 to 15B show another embodiment of the invention. Note that like reference numerals will be given to portions which are substantially like to those of the prior embodiment, and the description thereof will be omitted.

As is shown in FIG. 7, a fastener 10a of this embodiment is used to mount detachably a trim member 5 on a body panel 1 by inserting the fastener 10a into a mounting hole 2 in the body panel 1 through an insertion hole 6 provided in the trim member 5 so as to be fixed therein.

Hereinafter, a configuration of the fastener 10a will be described. Firstly, referring to FIGS. 7 to 10B, a main body 20 which is brought into engagement with the mounting hole 2 to be fixed therein will be described. This main body 20 has a circular base portion 21 with a predetermined thickness, and an insertion opening 23 for a pin member 40 is provided to a predetermined depth from a front side of the base portion 21. As is shown in FIGS. 9A, 10A, 10B, a quadrangular pin insertion hole 23d, through which an insertion portion 43 of the pin member 40 (which will be described later) is inserted, is formed in a bottom wall of the insertion opening 23.

A pair of cutout grooves 23e, 23e are formed on inner circumferences of a pair of facing side surfaces of the pin insertion hole 23d. Second pin-side engagement portions 58 of the pin member 40 (which will be described later) are brought into engagement with the cutout grooves 23e, and the cutout grooves 23e configure a second main-body-side engagement portion of this embodiment.

An angular cylindrical leg portion 30 which is opened at a distal end thereof projects from a rear surface side of the base portion 21. Namely, this leg portion 30 has a pair of side walls 31, 31 which project from rear sides of a pair of sides of the pin insertion hole 23d where the cutout grooves 23e, 23e are not formed and connecting walls 32, 32 which connect both side portions at distal ends of the pair of side walls 31, 31.

In addition, cutouts 31a, 31a are formed individually at the distal ends of the pair of side walls 31, 31. When the pin member 40 is pushed a predetermined depth into the main body 20, first pin-side engagement portions 57 (which will be described later) are brought into engagement with the cutouts 31a, 31a, and the cutouts 31a configure a first main-body-side engagement portion in this embodiment. In this way, the cutouts 31a configuring the first main-body-side engagement portion are disposed in the side surfaces perpendicular to the cutout grooves 23e configuring the second main-body-side engagement portion.

In addition, intermediate portions of the connecting walls 32, 32 which connect the distal ends of the pair of side walls 31, 31 are connected by a bridge wall 32a. This bridge wall 32a not only can improve the rigidity at the distal end of the leg portion 30 but also can protect the first pin-side engagement portions 57 which are in engagement with the cutouts 31a from an external force that would otherwise be applied thereto abruptly.

Similarly to the prior embodiment, a pair of deflectable elastic engagement pieces 35, 35 are formed continuously from proximal sides of the connecting walls 32 via slits 34 defined with the side walls 31, 31. Distal end portions 37, 37 of these elastic engagement pieces 35, 35 extend towards the insertion opening 23 in the main body 20. An outer surface of the distal end portion 37 forms a sloping surface 37c, and an upper end face 37d forms a flat plane. When the pin member 40 is inserted into the main body 20 and the first pin-side engagement portions 57 are brought into engagement with the cutouts 31a, both side portions (extension pieces 69b, which will be described later) of a pressing surface 62 are brought into abutment with the flat upper end faces 37d as is shown in FIG. 13A, whereby the pin member 40 can be held in the main body 20 with less looseness.

Next, referring to FIGS. 7, 8A, 8B and 11A to 12B, the pin member 40 which is inserted into the main body 20 so as to release the engagement of the main body 20 with the mounting hole 2 will be described.

Similarly to the prior embodiment, this pin member 40 has a head portion 41 and the insertion portion 43 which project from one side of the head portion 41.

As is shown in FIGS. 12A, 12B, a recess portion 41a, which is depressed into an arc-like shape with a predetermined depth, is formed on an upper surface of the head portion 41, and as is shown in FIGS. 13A, 13B, a circumferential edge portion 41b of the upper surface of the head portion 41 is made to be substantially level with an upper surface of the base portion 21 when the pin member 40 is assembled into the main body 20. By this configuration, as is shown in FIGS. 13A and 13B, when the leg portion 30 is inserted into the mounting hole 2 by pushing the head portion 41 by a finger or the like in a state where the pin member 40 is assembled into the main body 20, since the push-in force acts on the circumferential edge portion 41b of the upper surface of the head portion 41 and the upper surface of the base portion 21, the application of the push-in force only to the pin member 40 can be prevented as much as possible.

In addition, as is shown in FIGS. 8A and 11B, the insertion portion 43 has a substantially quadrangular base portion 60, and a plurality of lightening holes 61 are provided in both facing side surfaces thereof.

A pair of plate-like pieces 63, 63 extend a predetermined length from both the side surfaces of the base portion 60 where the lightening holes 61 are provided. The first pin-side engagement portion 57 projects from an outer surface at a distal end of each plate-like piece 63, and the first pin-side engagement portion 57 is brought into engagement with the cutout 31a configuring the main-body-side engagement portion. The pair of plate-like pieces 63, 63 pass along inner circumference of the side surfaces perpendicular to the cutout grooves 23e, 23e in the pin insertion hole 23d to thereby be inserted into an inner circumference of the leg portion 30 and are then pushed thereinto while the first pin-side engagement portions 57 are pressed against the inner surfaces of the side walls 31 to thereby be deflected. Further, a rib 67 is provided on an inner surface side of each plate-like piece 63 so as to project therefrom while extending along an axial direction of the plate-like piece 63, whereby the plate-like piece 63 is reinforced.

In addition, the distal ends of the plate-like pieces 63 are formed to have such a length that when the first pin-side engagement portions 57 are in engagement with the cutouts 31a, the distal ends of the plate-like pieces 63 do not project from the distal end of the leg portion 30 (refer to FIG. 13B) but project from the leg portion 30 when the second pin-side engagement portions 58 (which will be described later) are in engagement with the cutout grooves 23e (refer to FIGS. 15A, 15B).

Further, the pair of plate-like pieces 63, 63 are disposed outside both side portions of the pair of elastic engagement pieces 35, 35 in a direction perpendicular to a deflecting direction thereof (refer to FIGS. 13A, 13B) when the pin member 40 is assembled into the main body 20.

On the other hand, as is shown in FIGS. 11C and 12A, deflectable elastic walls 69 are provided on both side portions of the base portion 60 from which the plate-like pieces 63 are not extended, which deflectable elastic walls 69 connect both side portions of the pressing surface 62 with the head portion 41 via extension pieces 69b which are extended from an upper surface of the base portion 60 and have voids 70 on an inside diameter side thereof.

Then, the pressing surface 62 for pressing the distal end portions 37 of the pair of elastic engagement pieces 35, 35 is formed by a distal end face of the base portion 60 and the extension pieces 69b. This pressing surface 62 is depressed deep at a center thereof and is inclined so as to gradually project higher towards the other pair of side surfaces of the base portion 60 perpendicular to the pair of side surfaces in which the lightening holes 61 are formed, and the pressing surface 62 has a shape which expands into a substantially inverted V-shape as a whole, as is shown in FIG. 12A.

In addition, the second pin-side engagement portion 58, which is adapted to be brought into engagement with the cutout groove 23e in the pin insertion hole 23d, is formed on an outer surface of a connecting piece 69a of each elastic wall 69 in an axially intermediate position. Consequently, the first pin-side engagement portion 57 which is formed on the plate-like piece 63 and the second pin-side engagement portion 58 which is formed on the elastic wall 69 are in such a positional relationship that they are disposed on the side surfaces perpendicular to each other.

Namely, in this embodiment, the first pin-side engagement portions 57 are disposed on the pair of facing side surfaces of the insertion portion 43 and the second pin-side engagement portions 58 are disposed on the other pair of side surfaces perpendicular to the pair of side surfaces. In association with these pin-side engagement portions, on the main body 20, the cutouts 31a configuring the first main-body-side engagement portion and the cutout grooves 23e configuring the second main-body-side engagement portion are disposed on the pairs of side surfaces perpendicular to each other.

In this way, since the first pin-side engagement portions 58 and the second pin-side engagement portions 58 are disposed on the different pairs of side surfaces of the insertion portion 43 which are disposed so as to intersect substantially at right angles, an outside diameter of the insertion portion 43 can be made relatively small, whereby the pin member 40 and the main body 20 into which the pin member 40 is inserted and further, the whole of the fastener 10a can be made compact.

In addition, by providing the cutout grooves 23e in the pin insertion hole 23d, since the second pin-side engagement portions 58 can be inserted through the cutout grooves 23e when the pin member 40 is pushed into the main body 20, the second pin-side engagement portions 58 can be provided to project from an outer circumference of the insertion portion 43, whereby the pressing surface 62 can be formed wide easily.

In addition, as is shown in FIGS. 14A, 14B, when the first pin-side engagement portions 57 are brought into engagement with the cutouts 31a configuring the first main-body-side engagement portion, the second pin-side engagement portions 58 are brought into abutment with the inner circumferences of the cutout grooves 23e in a deflected condition. By this configuration, the looseness of the pin member 40 in the main body 20 is prevented.

Additionally, as is shown in FIGS. 15A, 15B, when the pin member 40 is pushed in further, the elastic engagement pieces 35 are deflected by the pressing surface to such an extent that the elastic engagement pieces 35 are not brought into engagement with the mounting hole 2, the fastener 10*a* can be pulled out of the mounting hole 2. As this occurs, the second pin-side engagement portions 58 are made to be brought into engagement with the rear circumferential edges of the cutout grooves 23*e*.

In addition, in this embodiment, a pressing force required when the second pin-side engagement portions 58 are brought into engagement with the rear circumferential edges of the cutout grooves 23*e*, which configure the second main-body-side engagement portion, is set to become larger than a pressing force required when the elastic engagement pieces 35 are deflected so as to be brought into engagement with the mounting hole 2. By this configuration, when the leg portion 30 is inserted into the mounting hole 2 by pushing the head portion 41 by the finger or the like in a state where the pin member 40 is assembled into the main body 20, it can be prevented that the pin member 40 is pushed further into the main body 20 whereby the elastic engagement pieces 35 are deflected inwards by the pressing surface 62 so as not to be brought into engagement with the mounting hole 2 before the elastic engagement pieces 35 are deflected inwards so as to pass through the mounting hole 2 to thereby be brought into engagement with the rear surface side thereof.

Next, a method for using the fastener 10*a* of this embodiment will be described. Namely, as is shown in FIGS. 7 and 8A, when the pin member 40 is pushed into the main body 20 with the elastic walls 69 of the pin member 40 aligned with the cutout grooves 23*r* of the main body 20, the first pin-side engagement portions 57 are pressed by the inner circumferences of the pair of side walls 31 of the leg portion 30, and the pair of plate-like pieces 63 are inserted while being deflected. As this occurs, since the first pin-side engagement portions 57 are disposed at the distal ends of the plate-like pieces 63, the plate-like pieces 63 are deflected easily to thereby reduce the insertion resistance, whereby the pin member 40 can smoothly be pushed in.

When the pin member 40 is pushed in further and the first pin-side engagement portions 57 reach the cutouts 31*a*, the plate-like pieces 63 are elastically restored. Then, as is shown in FIGS. 8B and 13A, 13B, the first pin-side engagement portions 57 enter the cutouts 31*a*, and the engagement portions 57*c* thereof are brought into engagement with the inner circumferential edges of the cutouts 31*a*, whereby the pin member 40 is held in the main body 20 while being prevented from being dislocated therefrom. As this occurs, as is shown in FIG. 13A, the tapering portions 58*b* of the second pin-side engagement portions are brought into elastic abutment with the inner circumferential edges of the cutout grooves 23*e*, whereby the pin member 40 can be held firmly in the main body 20 without any looseness.

Next, the body panel 1 and the trim member 5 are superimposed with the insertion hole 6 in the trim member 5 aligned with the mounting hole 2 in the body panel 1, and the leg portion 30 of the fastener 10*a* is inserted into the mounting hole 2 through the insertion hole 6 as is shown in FIGS. 13A, 13B. As this occurs, as has been described before, since the pressing force required when the second pin-side engagement portions 58 are brought into engagement with the rear circumferential edges of the cutout grooves 23*e* is set larger than the pressing force required when the elastic engagement pieces 35 are deflected so as to be brought into engagement with the mounting hole 2, if the leg portion 30 is inserted into the mounting hole 2 by pushing the head portion 41 by the finger or the like, there occurs no such situation that the pin member 40 is pushed into the main body 20, and hence, it can be prevented that the elastic engagement pieces 35 are deflected inwards by the pressing surface 62 so as not to be brought into engagement with the mounting hole 2.

Then, the pair of elastic engagement pieces 35 are pressed by the inner circumference of the mounting hole 2 and is inserted into the mounting hole 2 while being deflected. Then, when they pass through the mounting hole 2, the pair of elastic engagement pieces 35 are elastically restored, and the engagement stepped portions 35*c* thereof are brought into engagement with the rear circumferential edge of the mounting hole 2 and the base portion 21 is brought into abutment with a circumferential edge of the insertion hole 6 in the trim member 5. Thus, as is shown in FIGS. 14A, 14B, the trim member 5 is fixed to the body panel 1 via the fastener 10*a*.

As this occurs, the first pin-side engagement portions 57 are brought into engagement with the cutouts 31*a* which are formed at the distal ends of the side walls 31 of the leg portion 30 in such a way as to enter the cutouts 31*a*. Then, since the distal end of the pin member 40 is designed not to project from the distal end of the leg portion, if an external force is applied to the leg portion 30, an abrupt disengagement of the first pin-side engagement portion 57 from the cutouts 31*a* can be prevented.

In addition, when the fastener 10 is desired to be removed from the mounting hole 2 due to the necessity of removing the trim member 5 for servicing, by pushing the pin member 40 into the main body 20, the distal end portions 37 are pressed by the pressing surface 62 of the insertion portion 43, whereby the pair of elastic engagement pieces 35, 35 are deflected inwards to such an extent that they are not brought into engagement with the mounting hole 2 as is shown in FIG. 15A. In conjunction with this, the second pin-side engagement portions 58 are pressed, and the elastic walls 69 are pushed in while being deflected. When the engagement portions 58*c* of the second pin-side engagement portions 58 pass through the cutout grooves 23*e* to rear sides thereof, the elastic walls 69 are elastically restored, and the engagement portions 58*c* of the second pin-side engagement portions 58 are brought into engagement with the rear circumferential edges of the cutout grooves 23*e*. Thus, the condition is held in which the elastic engagement pieces 35, are deflected inwards to such an extent that they are not brought into engagement with the mounting hole 2, whereby the fastener 10*a* can be removed from the mounting hole 2.

As this occurs, since the length of both the sides of the pressing surface 62 is extended by the extension pieces 69*b* of the elastic walls 69, the width of the pressing surface 62 can be expanded, and the pressing of the distal end portions 37 of the elastic engagement pieces 35 is facilitated. In addition, since the elastic walls 69 where the second pin-side engagement portions 58 are provided are easily deflected by the voids 70, the second pin-side engagement portions 58 are easily brought into engagement with the cutout grooves 23*e*.

Incidentally, with the fastener 10*a* removed from the mounting hole 2, since the second pin-side engagement portions 58 are in engagement with the cutout grooves 23*e* and the pin member 40 is held in the pushed-in position, the pair of elastic engagement pieces 35, 35 are kept deflected inwards, and the pair of elastic engagement pieces 35, 35 cannot be fixed in the mounting hole 2 again in such a condition.

In the case of this embodiment, however, since the distal ends of the plate-like pieces 63 of the pin member 40 project from the distal end of the leg portion 30 in a state where the fastener 10*a* is removed from the mounting hole 2 (refer to FIGS. 15A, 15B), by pushing the distal ends of the plate-like pieces 63 which project from the leg portion 30 into the leg portion 30, the engagement between the cutout grooves 23*e* and the second pin-side engagement portions 58 can easily be disengaged without using any tool. By this configuration, a reuse of the fastener 10a can be realized by putting the pair of elastic engagement pieces 35, 35 back into the expanded condition.

Description of Reference Numerals

Figure 1:
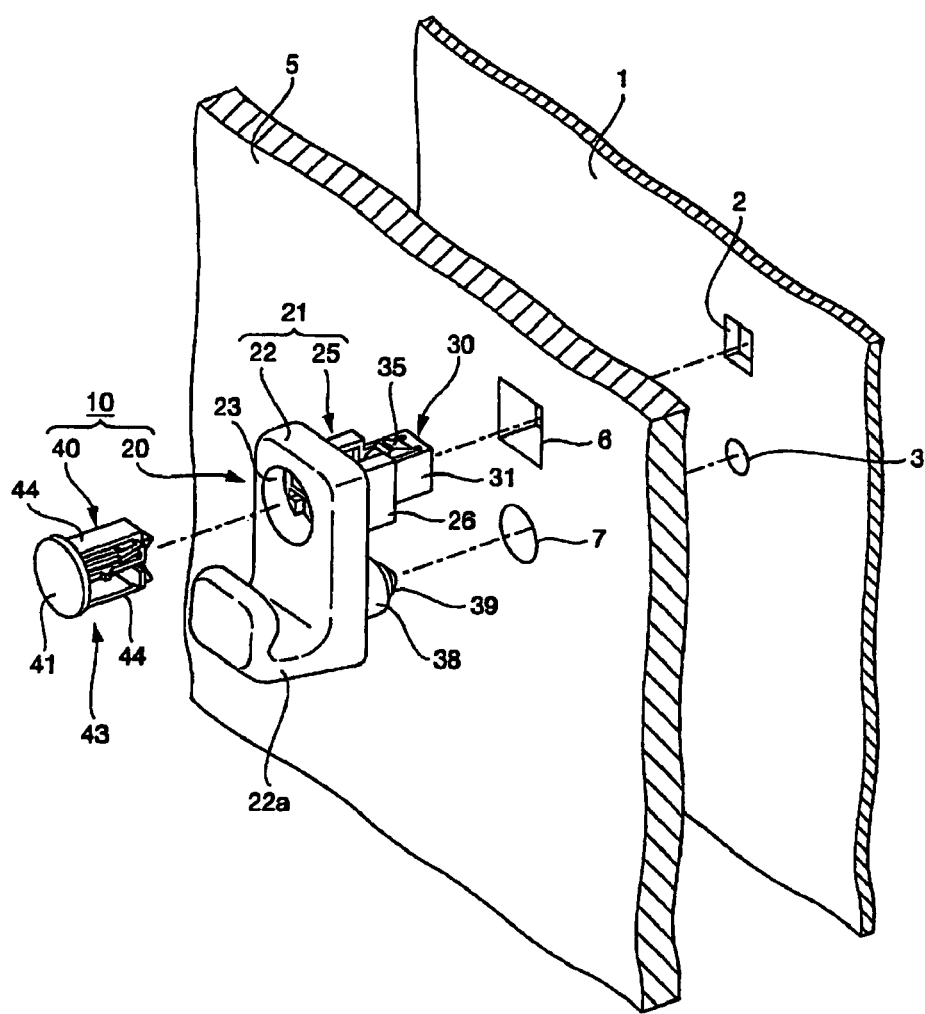
FIG. 1 is an exploded perspective view showing an embodiment of a fastener of the invention.
Figure 2:
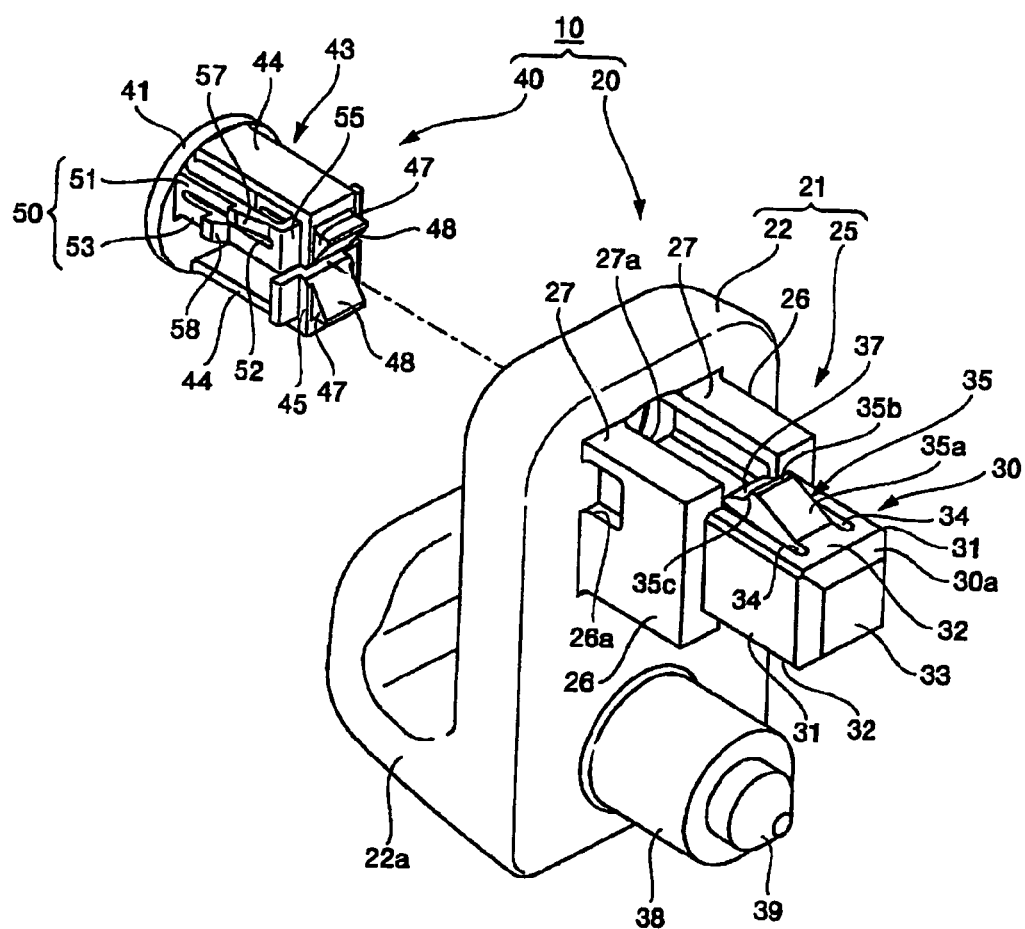
FIG. 2 is an exploded perspective view of the fastener when viewed from a back thereof.
Figure 3A:
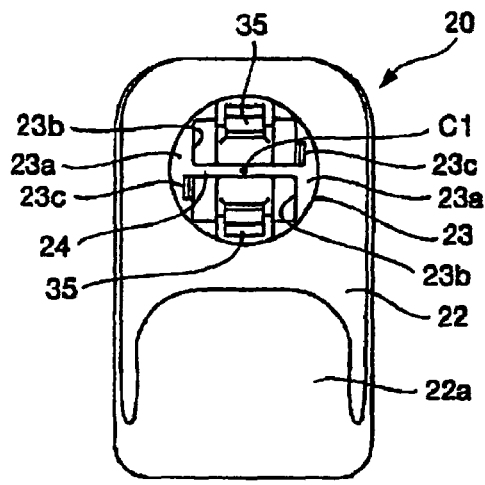
FIGS. 3A to 3C are views showing a main body making up the fastener, FIG. 3A being a front view, FIG. 3B being a sectional view, FIG. 3C being a plan view.
Figure 3B:
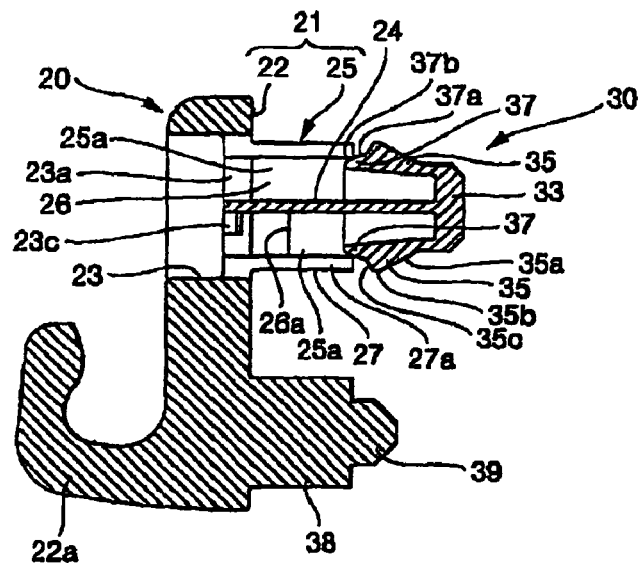
Figure 3C:
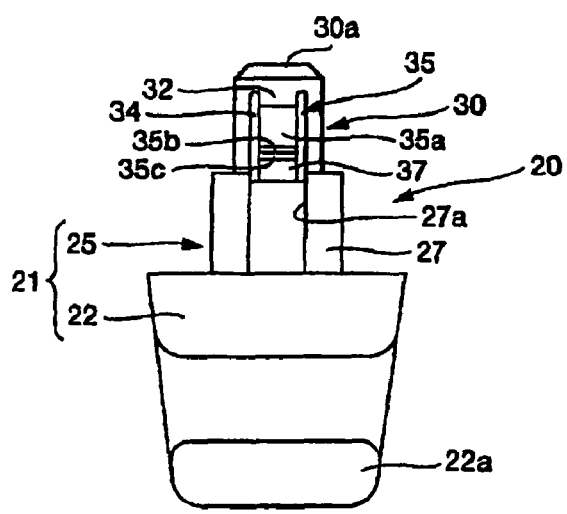
Figure 4A:
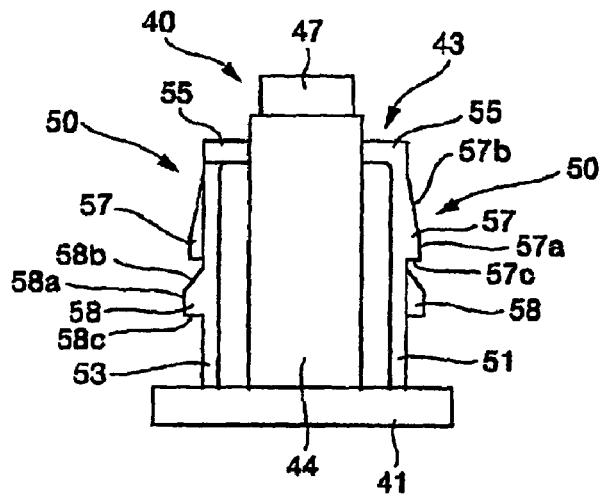
FIGS. 4A to 4C are views showing a pin member making up the fastener, FIG. 4A being a front view, FIG. 4B being a side view, FIG. 4C being a plan view.
Figure 4B:
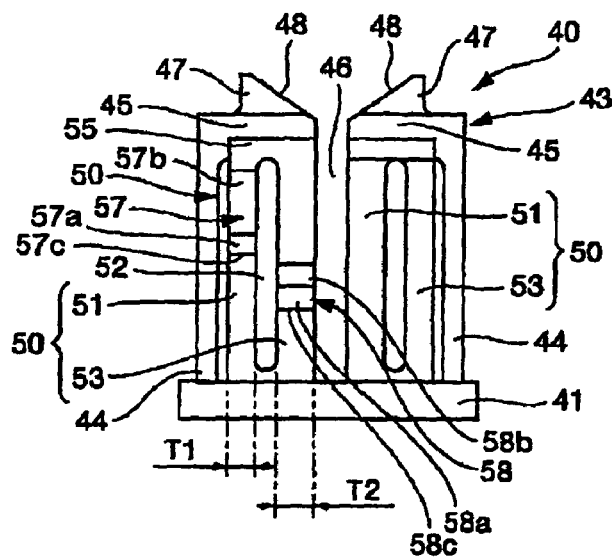
Figure 4C:
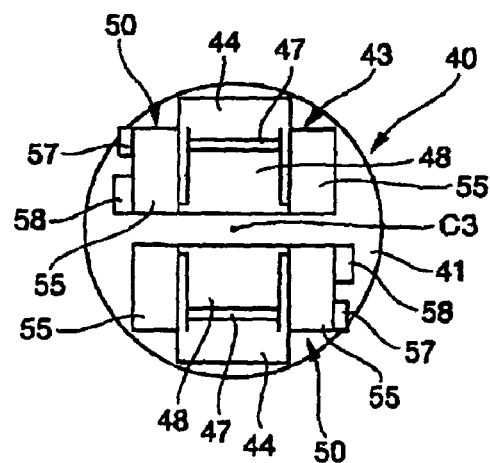
Figure 5A:
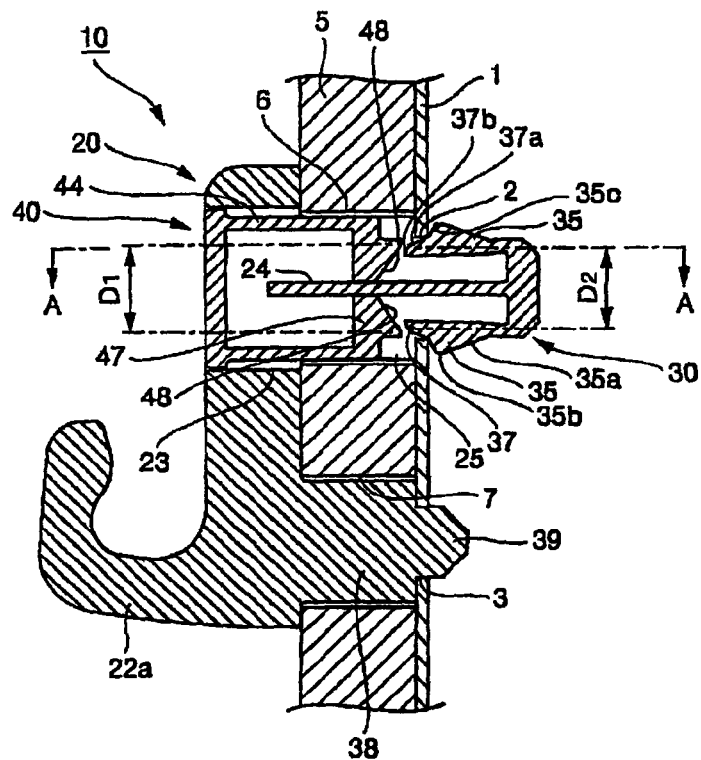
FIGS. 5A and 5B are views showing a condition where the fastener is fixed in a mounting hole, FIG. 5A being a sectional view, FIG. 5B being a sectional view taken along the line A-A in FIG. 5A.
Figure 5B:
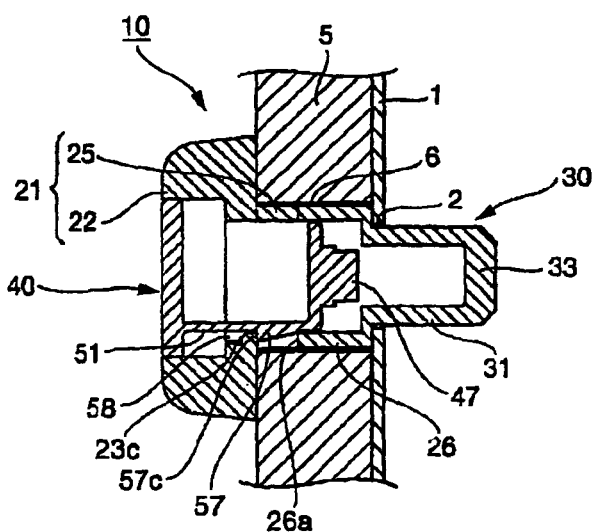
Figure 6A:
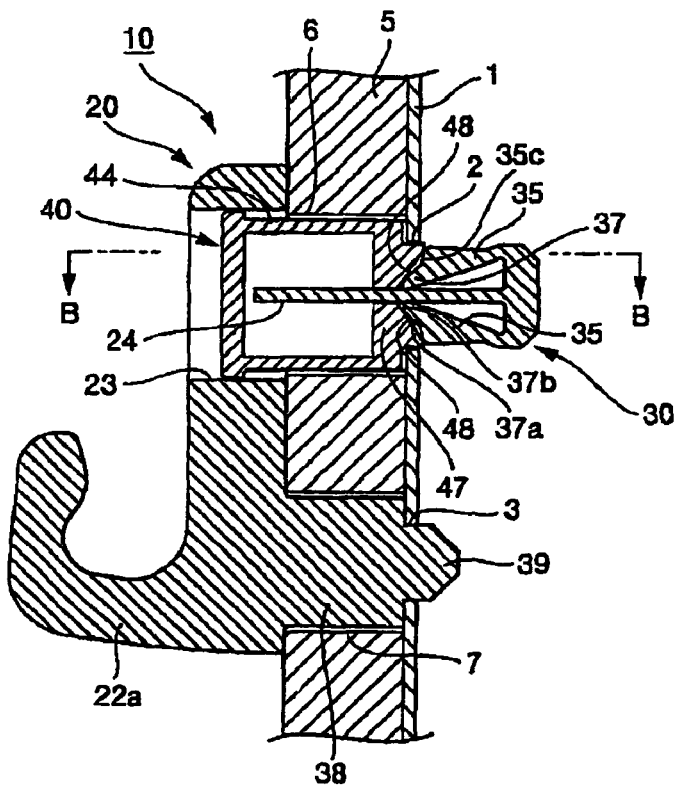
FIGS. 6A and 6B are views showing a condition where the engagement between the fastener and the mounting hole is released, FIG. 6A being a sectional view, FIG. 6B being a sectional view taken along the line B-B in FIG. 6A.
Figure 6B:
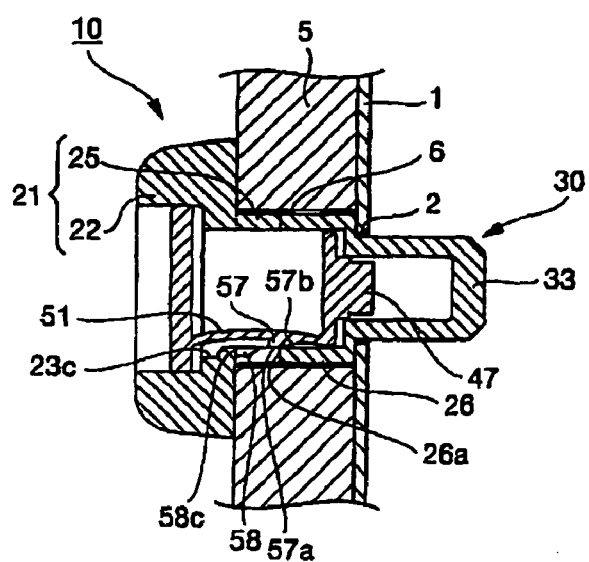
Figure 7:
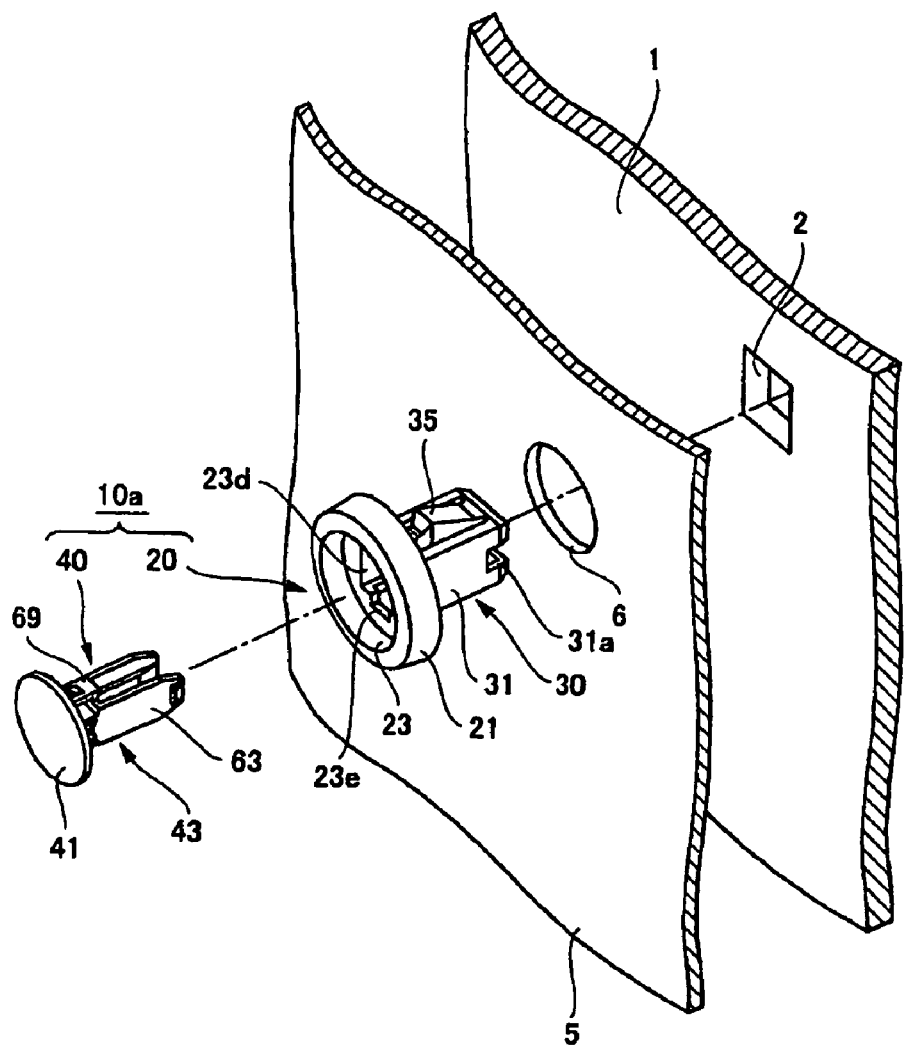
FIG. 7 is an exploded perspective view showing another embodiment of a fastener of the invention.
Figure 8A:
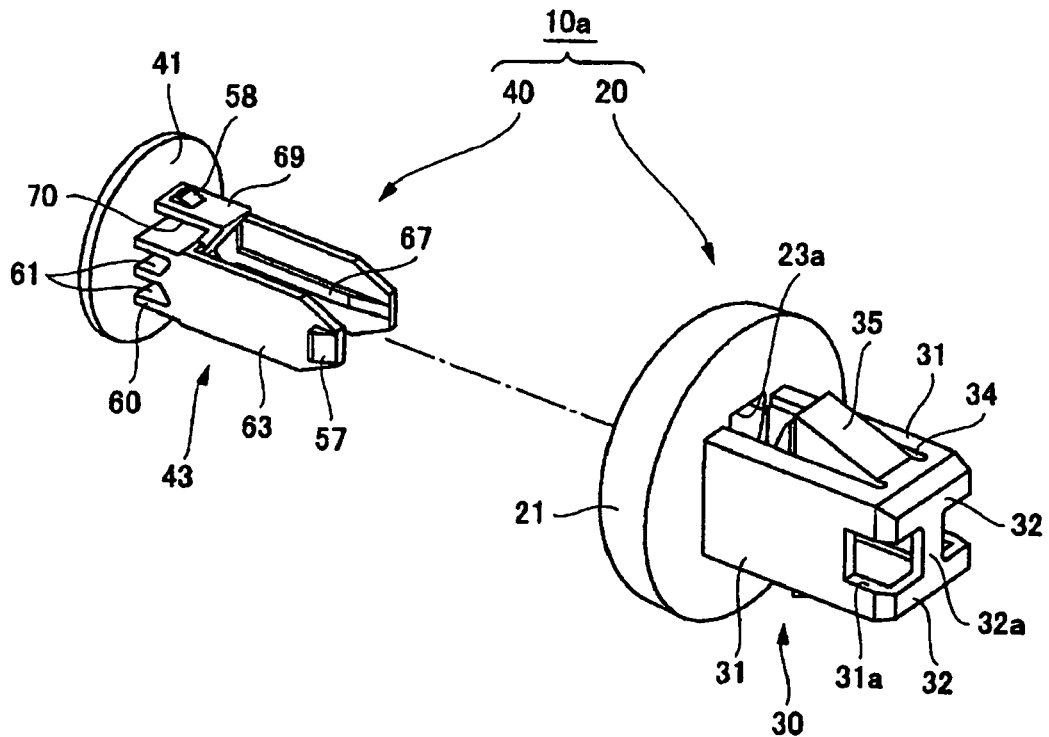
FIGS. 8A and 8B are views showing the fastener when viewed from a back thereof, FIG. 8A being a perspective view in a condition before the pin member is assembled into the main body, FIG. 8B being a perspective view in a condition where the pin member is assembled in to the main body.
Figure 8B:
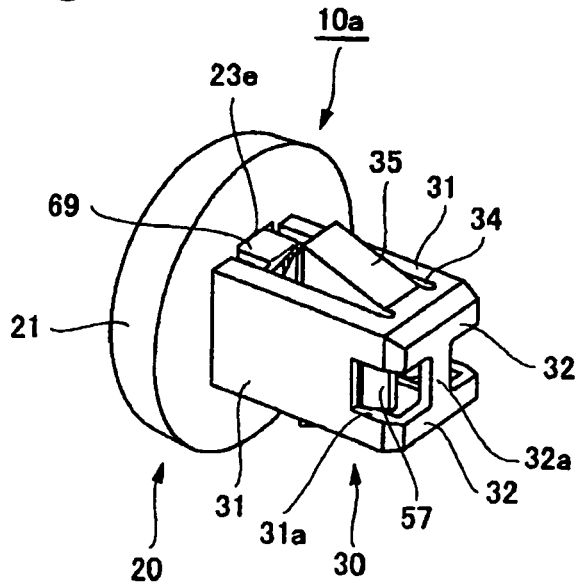
Figure 9A:
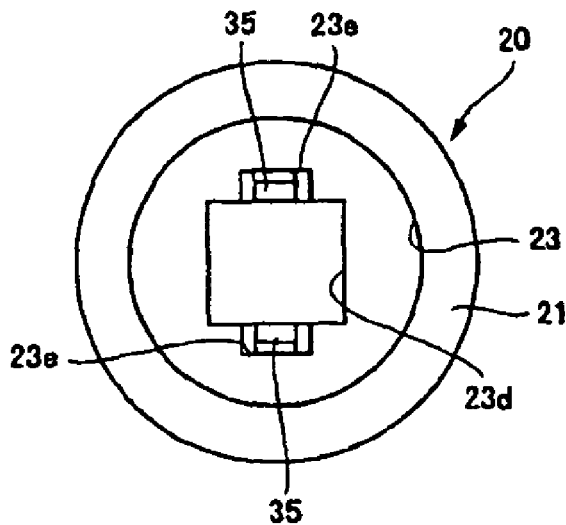
FIGS. 9A to 9C are views showing a main body of the fastener, FIG. 9A being a plan view, FIG. 9B being a front view, FIG. 9C being a side view.
Figure 9B:
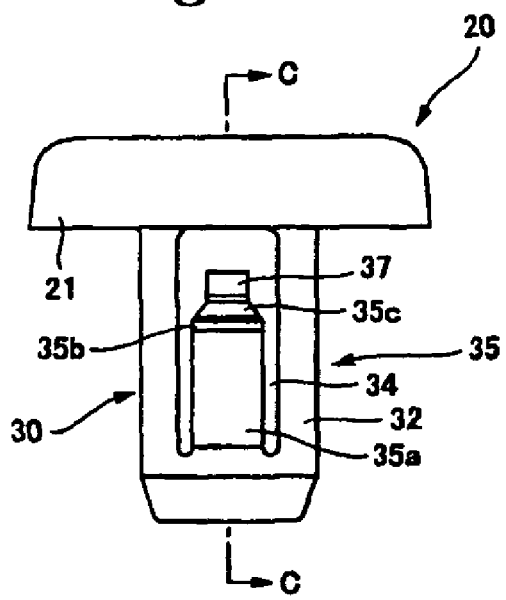
Figure 9C:
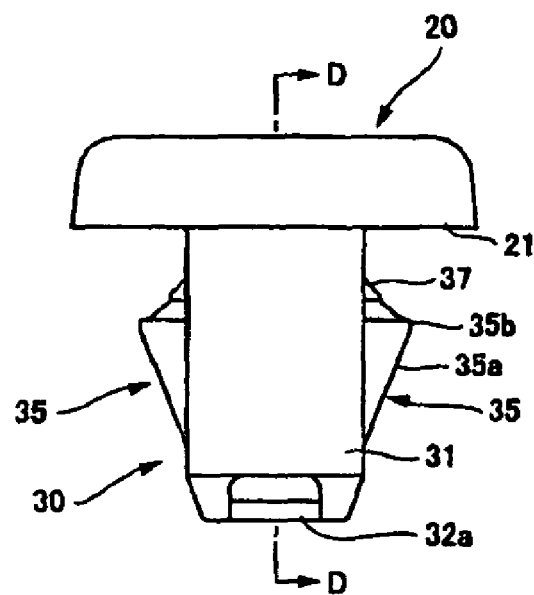
Figure 10A:
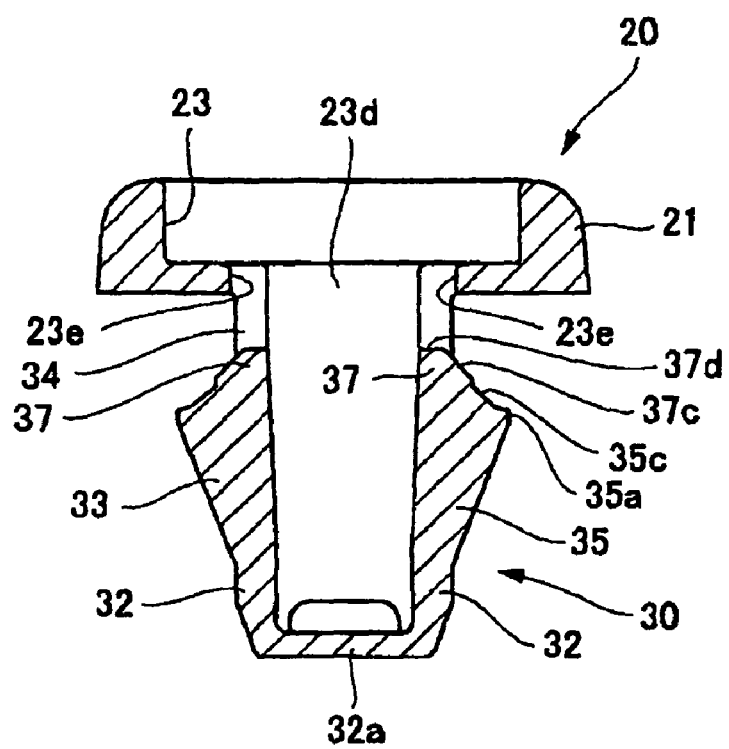
FIG. 10A is a sectional view taken along the line C-C in FIG. 9B.
Figure 10B:
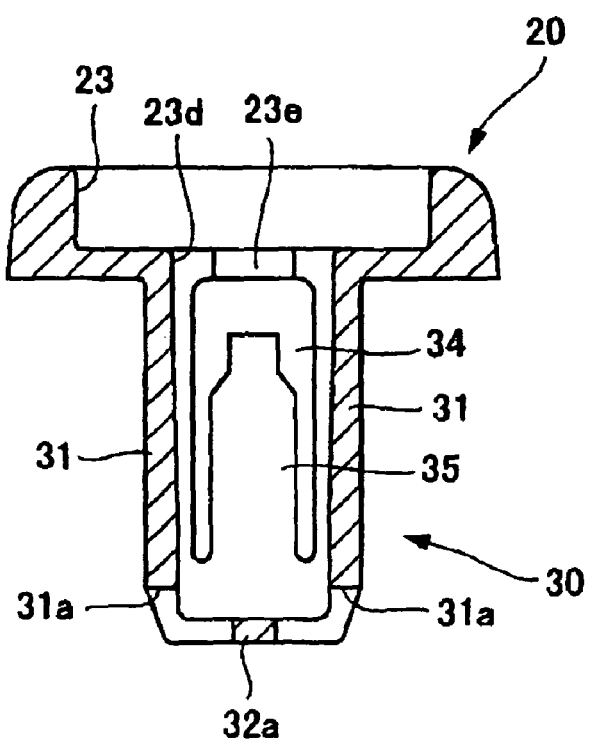
FIG. 10B is a sectional view taken along the line D-D in FIG. 9C.
Figure 11A:
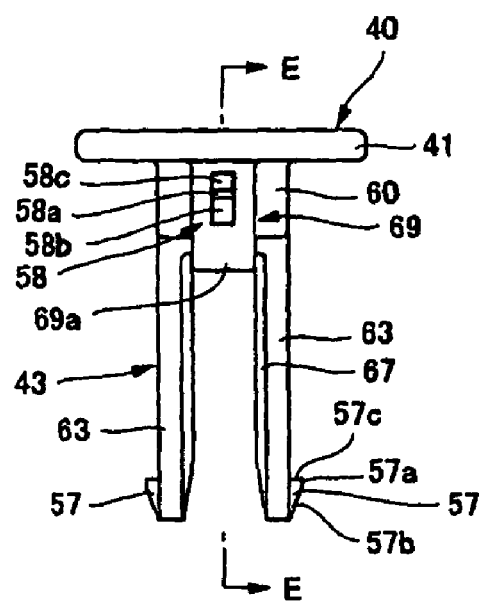
FIGS. 11A to 11C are views showing a pin member of the fastener of the invention, FIG. 11A being a front view, FIG. 11B being a side view, FIG. 11C being a bottom view.
Figure 11B:
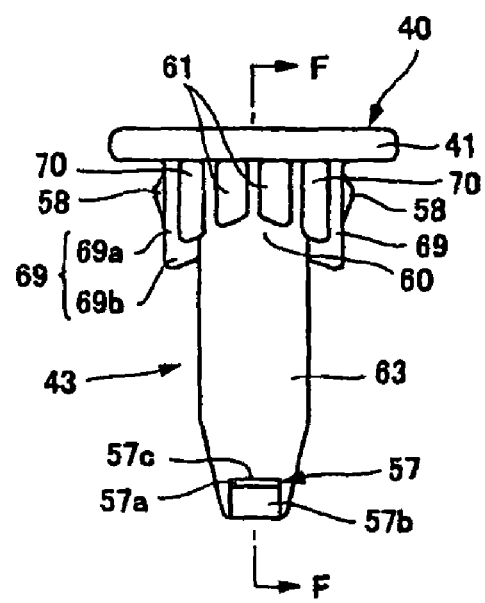
Figure 11C:
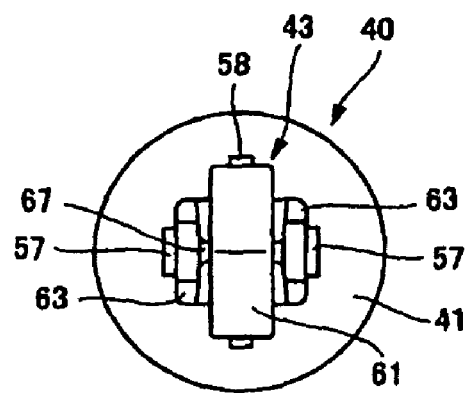
Figure 12A:
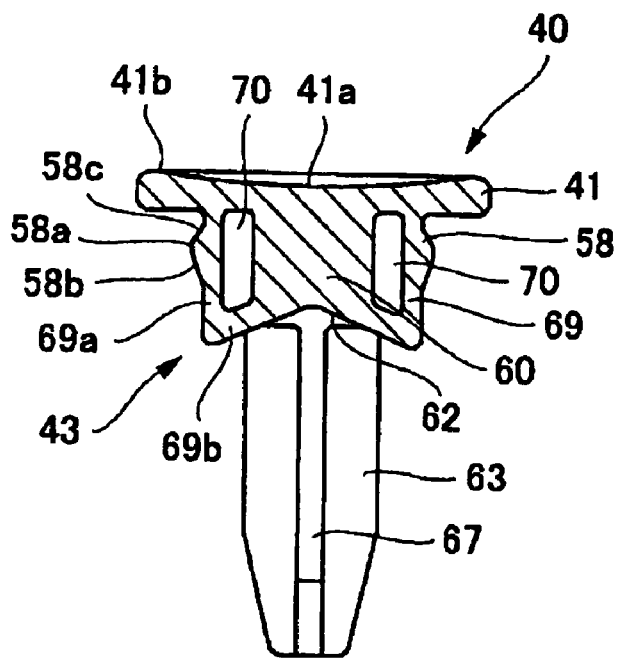
FIG. 12A is a sectional view taken along the line E-E in FIG. 11A.
Figure 12B:
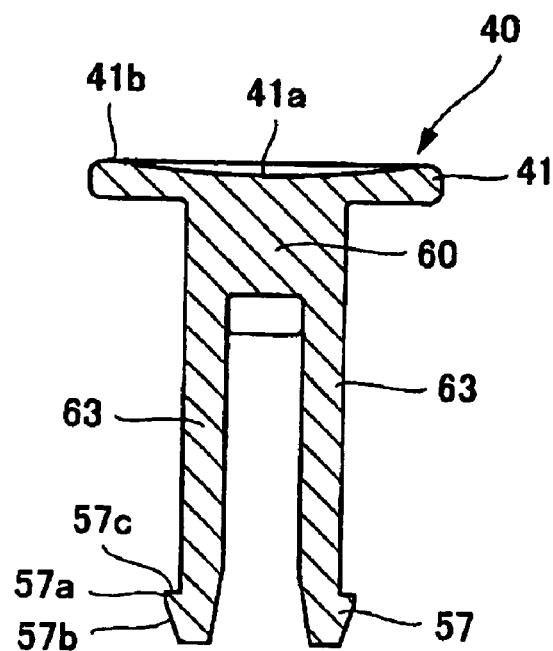
FIG. 12B is a sectional view taken along the line F-F in FIG. 11B.
Figure 13A:
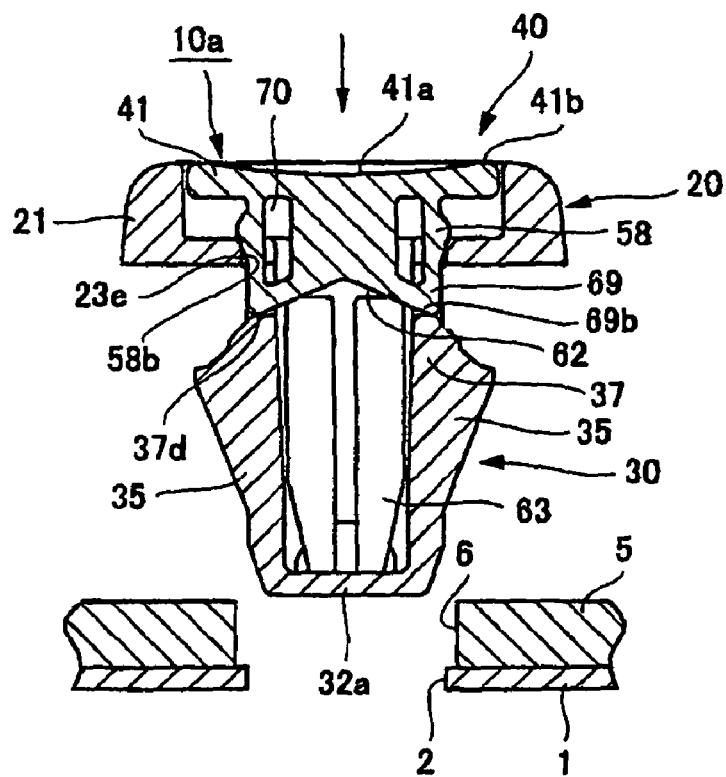
FIGS. 13A and 13B are views showing a condition resulting before the fastener of the invention is fixed in a mounting hole, FIG. 13A being a sectional view, FIG. 13B being a sectional view as viewed in a direction perpendicular to FIG. 13A.
Figure 13B:
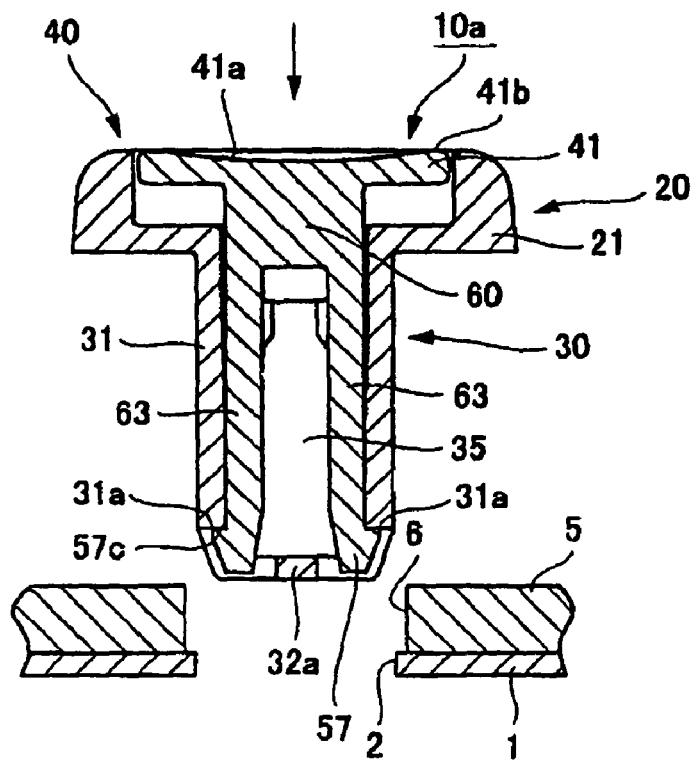
Figure 14A:
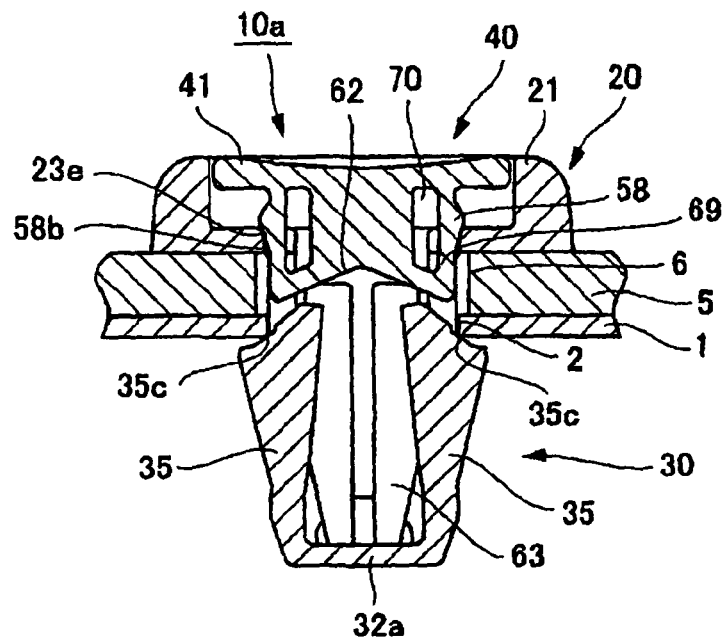
FIGS. 14A and 14B are views showing a condition where the fastener is fixed in the mounting hole, FIG. 14A being a sectional view, FIG. 14B being a sectional view as viewed in a direction perpendicular to FIG. 14A.
Figure 14B:
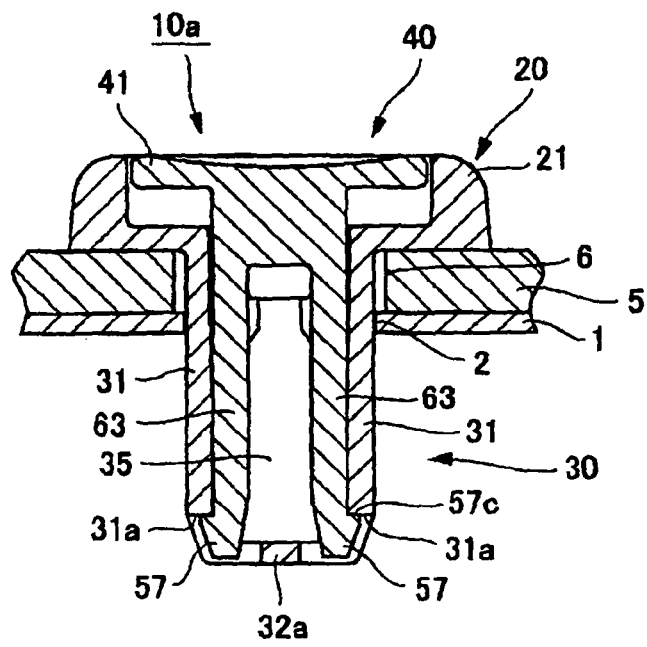
Figure 15A:
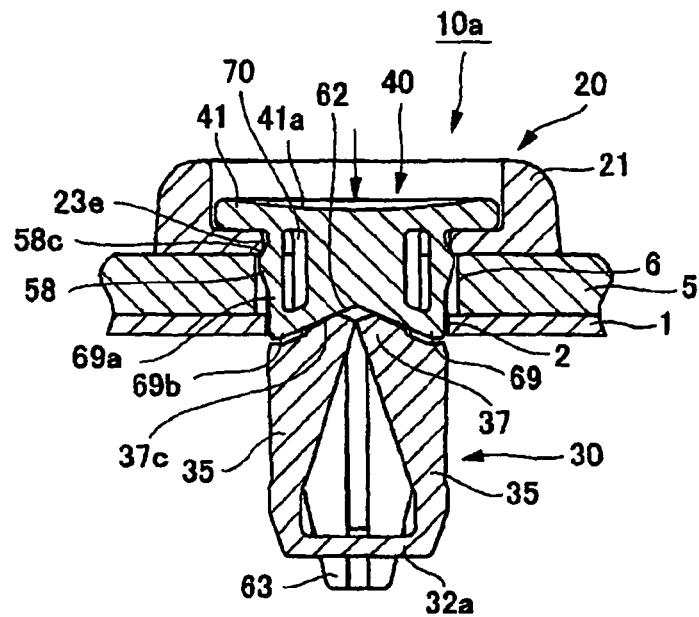
FIGS. 15A and 15B are views showing a condition where the engagement between the fastener and the mounting hole is released, FIG. 15A being a sectional view, FIG. 15B being a sectional view as viewed in a direction perpendicular to FIG. 15A.
Figure 15B:
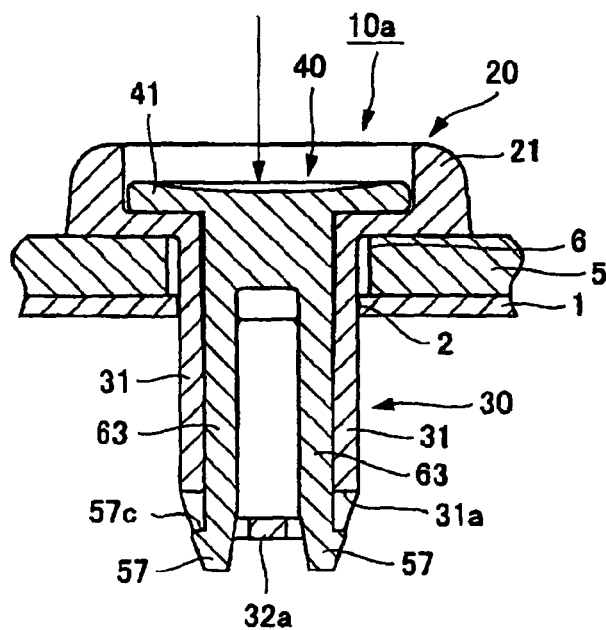

| | |
|---|---|
| 2 | mounting hole |
| 10, 10a | fastener |
| 20 | main body |

Description of Reference Numerals -continued

| | |
|---|---|
| 23 | insertion opening |
| 23c | recess portion |
| 23e | cutout groove |
| 24 | partition wall |
| 25a | space |
| 26 | side wall |
| 26a | opening portion |
| 27a | guide groove |
| 30 | leg portion |
| 31a | cutout |
| 32a | bridge wall |
| 35 | elastic engagement piece |
| 37 | distal end portion |
| 40 | pin member |
| 41 | head portion |
| 43 | insertion portion |
| 44 | pillar piece |
| 45 | bent portion |
| 46 | slit |
| 48, 62 | pressing surface |
| 50 | strip wall |
| 51 | first strip wall |
| 53 | second strip wall |
| 57 | first pin-side engagement portion |
| 57a | top portion |
| 57b | tapering portion |
| 58 | second pin-side engagement portion |
| 63 | plate-like piece |
| 69 | elastic wall |
| 70 | void |

The invention claimed is:

1. A fastener comprising a main body which is brought into engagement with a mounting hole formed in a mount-base part to be fixed therein and a pin member which is inserted into the main body for releasing the engagement of the main body with the mounting hole, wherein the main body includes a base portion which is brought into abutment with a front circumferential edge of the mounting hole and a leg portion which projects from a rear surface side of the base portion so as to be inserted into the mounting hole, the base portion having an insertion opening for the pin member provided on a front side thereof, the leg portion having a pair of facing elastic engagement pieces provided thereon for engagement with a rear circumferential edge of the mounting hole, wherein the elastic engagement pieces are shaped to extend from proximal end portions thereof towards the base portion, wherein the elastic engagement pieces each comprise:
a tapering surface gradually projecting outwards as extending towards the base portion, on an outer surface thereof;
a top portion projecting most outwards of the tapering surface; and
an engagement stepped portion being reduced in a projecting height gradually from the top portion to be brought into engagement with the rear circumferential edge of the mounting hole, wherein the elastic engagement pieces further comprises distal end portions each formed to extend from an inner side of the engagement stepped portion towards the insertion opening for the pin member, wherein the pin member includes a head portion and an insertion portion which projects from one side thereof, the insertion portion having a pressing surface provided thereon for pressing the distal end portions of the pair of elastic engagement pieces when the pin member is inserted into the base portion to be pushed a predetermined distance thereinto so as to deflect the pair of elastic engagement pieces inwards to such an extent that the pair of elastic engagement pieces are not brought into engagement with the mounting hole, and wherein a pin-side engagement portion and a main-body-side engagement portion are provided between the pin member and the base portion of the main body for holding the pin member in a predetermined pushed-in position when the pin member is inserted into the base portion.

2. The fastener of claim 1, wherein the pin-side engagement portion comprises a first pin-side engagement portion which is provided on the insertion portion of the pin member and a second pin-side engagement portion which is provided closer to a proximal end side than the first pin-side engagement portion on the insertion portion of the pin member, and wherein the pin member is held in a position where the pin member does not press the respective distal end portions of the elastic engagement pieces in a state where the first pin-side engagement portion is in engagement with the main-body-side engagement portion, while the pressing surface of the pin member press the respective distal end portions of the elastic engagement pieces so as to deflect them inwards in a state where the second pin-side engagement portion is in engagement with the main-body-side engagement portion.

3. The fastener of claim 2, wherein the first pin-side engagement portion comprises a projection which projects at a predetermined height from a side surface of the insertion portion, the projection having a top portion and a tapering portion which becomes smaller in height gradually towards the distal end portion, and wherein the tapering portion of the first pin-side engagement portion is brought into press contact with a predetermined portion of the base portion to thereby impart an urging force in a pull-out direction to the pin member.

4. The fastener of claim 2, wherein the main-body-side engagement portion comprises an opening portion which penetrates through a side wall of the base portion of the main body, and wherein the first pin-side engagement portion and the second pin-side engagement portion comprise projections which are formed on the insertion portion for engagement with an inner circumference of the opening portion.

5. The fastener of claim 4, wherein a recess portion is formed on an inner circumference of the base portion for accommodating the second pin-side engagement portion in a state where the first pin-side engagement portion is in engagement with the inner circumference of the opening portion configuring the main-body-side engagement portion.

6. The fastener of claim 1, wherein the insertion portion of the pin member is formed to be divided by a slit which extends in an axial direction, and wherein a partition wall is provided inside the base portion of the main body so as to extend along the axial direction to thereby enter the slit in the pin member when the pin member is inserted into the main body.

7. The fastener of claim 6, wherein the partition wall of the main body is situated between the pair of elastic engagement pieces when viewed in the axial direction, and wherein the insertion portion of the pin member is divided into two portions so that respective distal end faces of the two divided portions of the insertion portion configure sloping surfaces of which an inner slit side is made smaller in height and which are made to project to become gradually taller in height towards an outer side thereof, the sloping surfaces configuring the pressing surface.

8. The fastener of claim 1, wherein a strip wall disposed to extend in the axial direction along the insertion portion is provided on the pin member, and wherein the pin-side engagement portions are formed on the strip wall.

9. The fastener of claim 8, wherein the strip wall is made up of a pair of strip walls which are disposed side by side, and wherein the first pin-side engagement portion is provided on one of the pair of strip walls and the second pin-side engagement portion is provided on the other.

10. The fastener of claim 8, wherein the insertion portion is made up of a pair of pillar pieces which extend a predetermined length from one side of the head portion and bent portions which are made by bending distal ends of the pillar pieces in a direction in which they approach each other or in a direction in which they are apart from each other into a substantially L-shape, and wherein the pressing surface is provided on an outer surface of each of the bent portions and the strip walls are formed so as to connect the bent portions to the head portion.

11. The fastener of claim 1, wherein guide grooves into which the insertion portion enters are provided on facing side walls of the base portion in positions which are aligned with the pair of elastic engagement pieces so as to extend along an axial direction of the base portion.

12. The fastener of claim 2, wherein the first pin-side engagement portion is disposed on one side surface of the insertion portion of the pin member and the second pin-side engagement portion is disposed on another side surface which intersects substantially at right angles to the one side surface, and wherein a first body-side engagement portion with which the first pin-side engagement is brought into engagement and a second main-body-side engagement portion with which the second pin-side engagement portion is brought into engagement are provided on the main body.

13. The fastener of claim 12, wherein a pressing force required when the second pin-side engagement portion is brought into engagement with the second main-body-side engagement portion is set larger than a pressing force required when the elastic engagement pieces are deflected so as to be brought into engagement with the mounting hole.

14. The fastener of claim 12, wherein the insertion portion has a pair of plate-shaped pieces which are extended from side surfaces thereof, and wherein the first pin-side engagement portion is disposed at distal ends of the pair of plate-shaped pieces.

15. The fastener of claim 12, wherein elastic walls are provided on the insertion portion which connect both side portions of the pressing surface and the head portion and which have voids at an inner diameter side, and wherein the second pin-side engagement portion is provided on the elastic walls.

16. The fastener of claim 12,
wherein the leg portion of the main body has a cylindrical shape having an opening at a distal end, and
wherein the first main-body-side engagement portion is provided at an edge portion of the opening at the distal end of the leg portion.

17. The fastener of claim 16,
wherein a cutout is formed at the edge portion of the opening at the distal end of the leg portion, and
wherein the first main-body-side engagement portion is provided inside the cutout.

18. The fastener of claim 12,
wherein the insertion portion has such a length that a distal end of the insertion portion does not project from the distal end of the leg portion when the first pin-side engagement portion is in engagement with the first main-body-side engagement portion but projects from the distal end of the leg portion when the second pin-side engagement portion is in engagement with the second main-body-side engagement portion.

19. The fastener of claim 12,
wherein a cutout groove is provided on the insertion opening provided in the base portion of the main body, and
wherein the second pin-side engagement portion of the pin member is brought into engagement with the cutout groove.

20. The fastener of claim 12,
wherein the second pin-side engagement portion is brought into abutment with the inner circumference of the base portion in a deflected condition in a state where the first pin-side engagement portion is in engagement with the first main-body-side engagement portion.

21. The fastener of claim 17,
wherein the cutout is formed in facing side surfaces at the distal end of the cylindrical leg portion, and
wherein facing surfaces where the cutout is not formed are connected by a bridge wall.

* * * * *